US008010047B2

(12) United States Patent
Terashima

(10) Patent No.: US 8,010,047 B2
(45) Date of Patent: Aug. 30, 2011

(54) RADIO COMMUNICATION SYSTEM, RADIO COMMUNICATION DEVICE, AND RADIO COMMUNICATION METHOD

(75) Inventor: Toru Terashima, Kanagawa (JP)

(73) Assignee: Sony Corporation (JP)

( * ) Notice: Subject to any disclaimer, the term of this patent is extended or adjusted under 35 U.S.C. 154(b) by 856 days.

(21) Appl. No.: 11/208,795

(22) Filed: Aug. 22, 2005

(65) Prior Publication Data

US 2006/0046655 A1 Mar. 2, 2006

(30) Foreign Application Priority Data

Aug. 27, 2004 (JP) ................ P2004-247833

(51) Int. Cl.
*H04B 7/24* (2006.01)
*H04B 7/00* (2006.01)
*G09F 27/00* (2006.01)
(52) U.S. Cl. ......... 455/41.2; 455/39; 455/41.3; 381/124
(58) Field of Classification Search .............. 455/39, 455/41.1, 41.2, 41.3; 381/124
See application file for complete search history.

(56) References Cited

U.S. PATENT DOCUMENTS

| 4,245,191 | A | * | 1/1981 | Schroeder | 324/337 |
| 4,983,976 | A | * | 1/1991 | Ogata et al. | 342/42 |
| 5,926,546 | A | * | 7/1999 | Maeda et al. | 705/65 |
| 5,995,019 | A | * | 11/1999 | Chieu et al. | 340/10.32 |
| 7,373,145 | B2 | * | 5/2008 | Wandel | 455/425 |
| 7,613,185 | B2 | * | 11/2009 | Elliott | 370/392 |
| 2002/0128052 | A1 | | 9/2002 | Neagley et al. | |
| 2003/0016735 | A1 | * | 1/2003 | Edmonson et al. | 375/219 |
| 2003/0104848 | A1 | | 6/2003 | Brideglall | |
| 2003/0228885 | A1 | * | 12/2003 | Hattori et al. | 455/556.1 |
| 2004/0087345 | A1 | * | 5/2004 | Girard | 455/562.1 |
| 2004/0177032 | A1 | * | 9/2004 | Bradley et al. | 705/38 |
| 2004/0203387 | A1 | * | 10/2004 | Grannan | 455/41.2 |
| 2004/0224638 | A1 | * | 11/2004 | Fadell et al. | 455/66.1 |
| 2005/0068225 | A1 | * | 3/2005 | Inoue et al. | 342/70 |

FOREIGN PATENT DOCUMENTS

| JP | 1-182782 A | 7/1989 |
| JP | 3-063586 A | 3/1991 |
| JP | 08335890 A | 12/1996 |
| JP | 09093168 A | 4/1997 |
| JP | 2002112383 A | 4/2002 |
| JP | 2003-291809 A | 10/2003 |
| JP | 2004128672 A | 4/2004 |
| JP | 2004140580 A | 5/2004 |
| JP | 2004159303 A | 6/2004 |
| JP | 2005-136943 A | 5/2005 |

OTHER PUBLICATIONS

Office Action from Japanese Application No. 2004-247833, dated Mar. 16, 2010.

* cited by examiner

*Primary Examiner* — Andrew Wendell
(74) *Attorney, Agent, or Firm* — Lerner, David, Littenberg, Krumholz & Mentlik, LLP

(57) ABSTRACT

A radio communication system for transmitting voice or music data includes a data supplying source device for supplying the voice or music data, the data supplying source device having a reflector for transmitting a reflected wave signal obtained by modulating a received radio wave based on the data to be transmitted; and a data supply destination device for receiving the voice or music data, the data supply destination device having a reflected wave reader for transmitting an unmodulated carrier and for reading a reflected wave signal resulting from modulation of the unmodulated carrier. The voice or music data is transmitted by reflected wave transmission between the data supplying source device and the data supply destination device.

26 Claims, 15 Drawing Sheets

RADIO COMMUNICATION SYSTEM, RADIO COMMUNICATION DEVICE, AND RADIO COMMUNICATION METHOD

CROSS-REFERENCE TO RELATED APPLICATIONS

The present application claims priority from Japanese Patent Application No. JP 2004-247833 filed on Aug. 27, 2004, the disclosure of which is hereby incorporated by reference herein.

BACKGROUND OF THE INVENTION

The present invention relates to a radio communication system, a radio communication device, and a radio communication method for realizing communication operation with low power consumption between devices at a relatively short distance from each other. Particularly, the present invention relates to a radio communication system, a radio communication device, and a radio communication method for performing non-contact, low power consumption, and high speed data transmission from a portable device that retains contents to a host device that manages contents.

More particularly, the present invention relates to a radio communication system, a radio communication device, and a radio communication method for performing non-contact, low power consumption, and high speed data transmission from a portable device that retains contents to a host device that manages contents, using a backscatter communication in which a reflected wave signal obtained by modulating an unmodulated carrier transmitted from a reflected wave reader side on the basis of transmission data on a reflector side is transmitted, and particularly to a radio communication system, a radio communication device, and a radio communication method for transmitting data of voice or music contents collected on a portable device side in a state of being reproducible by an audio reproducing device.

With the recent development of information technology, portable telephones and portable information terminals have become increasingly sophisticated. For example, these portable devices generally have functions of taking or recording contents such as a still image, a moving image, music and the like, and reproducing these recorded contents. In addition, a storage area built in a portable type audio reproducing device is increasing in capacity. That is, a style of carrying contents collected independently by a user has taken root.

On the other hand, contents collected within a portable device are usually closed within the portable device. That is, to listen to contents stored in the portable device on a stationary type reproducing device such as a television set, a video or an audio player or the like often requires a complicated operation of transferring the contents to a host device such as a PC or the like and then transferring the contents to a medium such as a CD, a DVD or the like. Although products connectable by a cradle or a docking type product or a wire cable such as a USB cable or the like have appeared as portable type audio reproducing devices, an installation place is limited, and there are problems of wear of contacts and limitation in shape.

Attention has been directed to a wireless connection system as a system for freeing users from wire connection. A wireless LAN, for example, allows a portable terminal to be moved relatively easily since most of a wire cable can be omitted in a work space such as an office or the like. Also, introducing a personal area network (PAN) is being considered to construct a small-scale wireless network between a plurality of electronic devices present around a person and thereby perform information communication.

Various radio communication systems using frequency bands that do not require a license from competent authorities, such as a 2.4 GHz band and a 5 GHz band, for example, are defined. Regular standards for wireless networks include, for example, IEEE (Institute of Electrical and Electronics Engineers) 802.11 (see, for example, International Standard ISO/IEC 8802-11: 1999(E) ANSI/IEEE Std 802.11, 1999 Edition, Part 11: Wireless LAN Medium Access Control (MAC) and Physical Layer (PHY) Specifications), HiperLAN/2 (see, for example, ETSI Standard ETSI TS 101 761-1 V 1.3.1 Broadband Radio Access Networks (BRAN); HIPERLAN Type 2; Data Link Control (DLC) Layer; Part 1: Basic Data Transport Functions or ETSI TS 101 761-2 V 1.3.1 Broadband Radio Access Networks (BRAN); HIPERLAN Type 2; Data Link Control (DLC) Layer; Part 2: Radio Link Control (RLC) sublayer), IEEE802.15.3, and Bluetooth communication. The wireless LAN has recently spread markedly partly because wireless LAN systems have become inexpensive and are incorporated in a PC as standard.

However, the wireless LAN was originally designed and developed assuming that the wireless LAN would be used by computers. Hence, when the wireless LAN is incorporated into a mobile type device, power consumption of the device becomes a problem. Many of IEEE802.11b wireless LAN cards commercially available now consume a power of 800 mW or more at a time of transmission, and a power of 600 mW or more at a time of reception. This power consumption is a heavy load on a battery-driven portable device.

Even when the transmission power is reduced by limiting the operation of a wireless LAN function to a short distance, the power consumption can be reduced to only about 80 percent. In particular, a transmission from an image input device such as a digital camera or the like to an image display device side, or a transmission of voice or music contents collected by a portable telephone, an IC recorder, or another portable information terminal to an audio reproducing device, for example, is a mode of communication in which transmission from the portable device side accounts for most of the communication as a whole. Radio transmission means with low power consumption is desired all the more because many portable devices are driven by a battery.

In Bluetooth communication, power consumption is not so heavy a load as in a wireless LAN system, but transmission speed is low at 720 kbps even at a maximum, which is inconvenient because it takes time to transmit recent high-quality images. In particular, it takes much time to transfer high-volume contents from a portable device to a host device.

Furthermore, contents including various media of still images, moving images, music, data and the like may be transmitted from a portable device side connected by radio. Since a data encoding method differs for each of these media, a host device side needs to determine a media type of a content transmitted thereto, and start an appropriate decoder according to a result of the determination to perform a decoding process and content reproduction. An embedded device limited in operational capability, for example, has another problem of a heavy overhead involved in the media type determination and the decoding process.

It is desirable to provide an excellent radio communication system, an excellent radio communication device, and an excellent radio communication method that make it possible to realize communication operation with low power consumption between devices at a relatively short distance from each other.

It is also desirable to provide an excellent radio communication system, an excellent radio communication device, and an excellent radio communication method that make it possible to perform non-contact, low power consumption, and high speed data transmission from a portable device that retains contents to a host device that manages contents.

It is also desirable to provide an excellent radio communication system, an excellent radio communication device, and an excellent radio communication method that make it possible to transmit data of voice or music contents collected on a portable device side in a state of being reproducible by an audio reproducing device.

SUMMARY OF THE INVENTION

The present invention has been made in view of the above problems. According to a first embodiment of the present invention, there is provided a radio communication system for transmitting voice or music data, including a data supplying source device for supplying the voice or music data, the data supplying source device having a reflector for transmitting a reflected wave signal obtained by modulating a received radio wave based on the data to be transmitted; and a data supply destination device for receiving the voice or music data, the data supply destination device having a reflected wave reader for transmitting an unmodulated carrier and for reading a reflected wave signal resulting from modulation of the unmodulated carrier; wherein the voice or music data is transmitted by reflected wave transmission between the data supplying source device and the data supply destination device.

The "system" in this case refers to a logical set of a plurality of apparatuses (or functional modules for realizing specific functions), and whether each apparatus or functional module is present within a single casing is not of particular concern.

The data supplying source device is a portable device that collects voice or music contents, such as, for example, a portable telephone, a portable information terminal, a portable type audio reproducing device, or an IC recorder. The data supplying source device includes means for capturing external voice or music data and for storing the captured voice or music data; means for reproducing the stored voice or music data; and means for transmitting the stored voice or music data as the reflected wave signal using the reflector.

The data supply destination device is a stationary type host device that stores voice or music contents and decodes and reproduces data, such as a PC, a stationary type audio reproducing device or the like. The data supply destination device includes means for decoding and reproducing the voice or music data received as the reflected wave signal from the data supplying source device. The data supply destination device can thus reproduce and output an audio signal. The operational feeling of a user is not different between the case of audio reproduction on a portable device as a data supplying source and the case of audio reproduction after reflected wave transmission of audio data to a stationary type audio reproducing device as a data supply destination.

The radio communication system according to the embodiment of the present invention is intended to realize non-contact, low power consumption, and high speed data transmission in a communication mode in which transmission from the data supplying source device accounts for most of the communication between the devices limited to a relatively short distance therebetween. Radio transmission using reflected waves based on a backscatter system used in RFID is performed. An RFID system itself is widely known in the art as an example of radio communication means applicable only in the case of a relatively short distance.

A radio communication device as the data supplying source uses a reflector based on a reflected wave communication method as a radio transmission module instead of a conventional wireless LAN module. A radio communication device as the data supply destination uses a reflected wave reader for transmitting an unmodulated carrier and for reading a modulated reflection signal from the reflector as a wireless transmission module instead of a wireless LAN module.

The reflector includes an antenna, an antenna switch, and an antenna load. Receiving transmission data composed of a bit sequence, the reflector turns on/off the antenna switch connected to the antenna according to a bit image of the data. For example, when the data is 1, the antenna switch is turned on, and when the data is 0, the antenna switch is turned off.

When the antenna switch is on, the antenna is terminated by the antenna load, and when the antenna switch is off, the antenna is made open. This operation acts to terminate an unmodulated carrier coming from the data supply destination device when the antenna switch is on, and to reflect the unmodulated carrier when the antenna switch is off. That is, the transmission data is basically transmitted as the reflected wave of the radio wave from the transfer destination by a backscatter method, the reflected wave being generated by variation in antenna load impedance, which variation accompanies the on/off operation of the antenna switch. Thus, by detecting the reflection of the transmitted radio wave, the data supply destination device can read the transmission data.

Reflected wave modulation based on the on/off operation of the antennal load impedance is equivalent to ASK (Amplitude Shift Keying) modulation, and has a relatively low bit rate. Of course, in addition to ASK modulation, a PSK or a FSK modulation method can be applied even in the backscatter communication method. For example, by providing a plurality of reflection paths having different phases from each other, and switching the reflection paths according to transmission data, it is possible to realize a phase modulation method with a higher bit rate, such as BPSK, QPSK, 8PSK modulation or the like.

The reflector on the side of the data supplying source device may not only perform backscatter uplink transmission to the reflected wave reader, but also may include a band-pass filter and an ASK detecting unit for performing a receiving process for an ASK modulated wave signal transmitted by downlink transmission from the reflected wave reader. While the two blocks are used when receiving an ASK modulated delivery acknowledging signal from the transfer destination, the two blocks are not required in one-way transmission without transmission delivery acknowledgement. In addition to ASK modulation, a PSK or a FSK modulation method can be applied in the RFID backscatter communication method.

The antenna switch used to modulate the reflected wave of a received radio wave on the reflector side is generally formed by a gallium arsenide IC which consumes power of a few 10 μW or lower. Thus, the above-described communication method makes it possible to achieve non-contact, ultralow power consumption, and high speed radio audio transmission. For reception of an ASK modulated signal from the reflected wave reader side, the band-pass filter is used to pass signals of frequencies in a predetermined frequency band and to attenuate signals in other frequency bands. The power consumption of the ASK detecting unit, which consumption is necessary in delivery acknowledgment, is 30 mW or less.

Hence, the radio communication system according to the embodiment of the present invention enables audio data transmission with an average power of 10 mW or lower in the case of a delivery acknowledgment method, and an average power of a few 10 µW in the case of one-way transmission. This represents an overwhelming difference in performance as compared with the average power consumption of an ordinary wireless LAN.

The data supply destination device may further include means for receiving a remote controller signal, and reflected wave transmission may be performed between the data supply destination device and the data supplying source device according to the remote controller signal.

In this case, in response to a received remote controller signal to reproduce voice or music data, the data supply destination device obtains the corresponding voice or music data from the data supplying source device by reflected wave transmission, and reproduces and outputs the voice or music data. In response to a received remote controller signal to stop reproduction of the voice or music data, the data supply destination device ends the reflected wave transmission of the corresponding voice or music data, and stops the reproduction of the voice or music data. Although audio contents to be reproduced are stored in a portable device as the data supplying source device rather than the data supply destination device performing audio reproduction, the operational feeling of a user is not different from that when the user directly operates the data supply destination device by a remote controller.

According to a second embodiment of the present invention, there is provided a radio communication system for transmitting a plurality of kinds of data generated by different encoding and decoding methods, including a data supplying source device for supplying data, the data supplying source device having a reflector for transmitting a reflected wave signal obtained by modulating a received radio wave based on the data to be transmitted; and a data supply destination device for receiving the transmitted data, the data supply destination device having a reflected wave reader for transmitting an unmodulated carrier and for reading a reflected wave signal resulting from modulation of the unmodulated carrier; wherein the data supplying source device describes information on an encoding and decoding method for the transmitted data in a header part of a data packet to be transmitted, and the data supply destination device starts a decoding process corresponding to the encoding and decoding method.

Contents including various media of still images, moving images, music, data and the like may be transmitted from a portable device side connected by radio. According to the second embodiment of the present invention, the data supply destination device can determine a decoding method on the basis of a description in a header part of a received data packet and start a desired decoder.

That is, according to the embodiment of the present invention, it is possible to start decoding a data part of the packet without waiting for a process on the data packet in a higher layer in a communication protocol. Therefore, an embedded device limited in operational capability can reduce the overhead involved in a media type determination and decoding process.

For example, when a stationary type audio reproducing device identifies received data as audio data, the audio reproducing device can feed the audio data directly into a decoder to decode the data, perform amplification, and output audio. When receiving a content such as an image or the like that the decoder is not ready for, the audio reproducing device discards the received data without transferring a process to a higher layer.

According to the present invention, it is possible to provide an excellent radio communication system, an excellent radio communication device, and an excellent radio communication method that make it possible to perform non-contact, low power consumption, and high speed data transmission from a portable device that retains contents to a host device that manages contents.

According to the present invention, it is possible to provide an excellent radio communication system, an excellent radio communication device, and an excellent radio communication method that make it possible to perform non-contact, low power consumption, and high speed data transmission from a portable device that retains contents to a host device that manages contents, using a backscatter communication in which a reflected wave signal obtained by modulating an unmodulated carrier transmitted from a reflected wave reader side based on the transmitted data on a reflector side is transmitted.

According to the present invention, it is possible to provide an excellent radio communication system, an excellent radio communication device, and an excellent radio communication method that make it possible to transmit data of voice or music contents collected on a portable device side in a state of being reproducible by an audio reproducing device, using reflected wave transmission.

Other and further objects, features, and advantages of the present invention will become apparent from a more detailed description on the basis of the accompanying drawings and embodiments of the present invention to be described later.

DETAILED DESCRIPTION

A preferred embodiment of the present invention will hereinafter be explained in detail with reference to the drawings.

The present invention is intended for transmission of high-volume data such as voice and music contents and the like by non-contact, low power consumption, and high speed communication operation in a communication mode in which most of communication between devices limited to a relatively short distance therebetween is accounted for by transmission from the data supplying source device. Radio transmission using reflected waves based on a backscatter system used in RFID is performed.

An RFID system itself is widely known in the art as an example of radio communication means applicable only in a local area. Methods for communication between a tag and a reader/writer include an electromagnetic coupling method, an electromagnetic induction method, a radio wave communication method and the like. Of these methods, the present invention relates to the radio wave communication method using microwaves in a 2.4 GHz band referred to as an ISM band (Industrial, Scientific and Medical band).

A radio communication system using a reflected wave transmission method includes a reflector for transmitting data by a modulated reflected wave and a reflected wave reader for reading the data from the reflected wave from the reflector. At a time of data transmission, the reflected wave reader transmits an unmodulated carrier. The reflector modulates the unmodulated carrier in such a manner as to correspond to transmission data by using load impedance operation such as turning on/off the termination of an antenna, for example, and thereby transmits the data. Then, the reflected wave reader side receives the reflected wave, and performs a demodulation and a decoding process to obtain the transmission data.

The reflector includes for example an antenna for reflecting an incident continuous radio wave, a circuit for generating the transmission data, and an impedance changing circuit for changing the impedance of the antenna in such a manner as to correspond to the transmission data (see Japanese Patent Laid-Open No. Hei 01-182782, for example).

Figure 1:
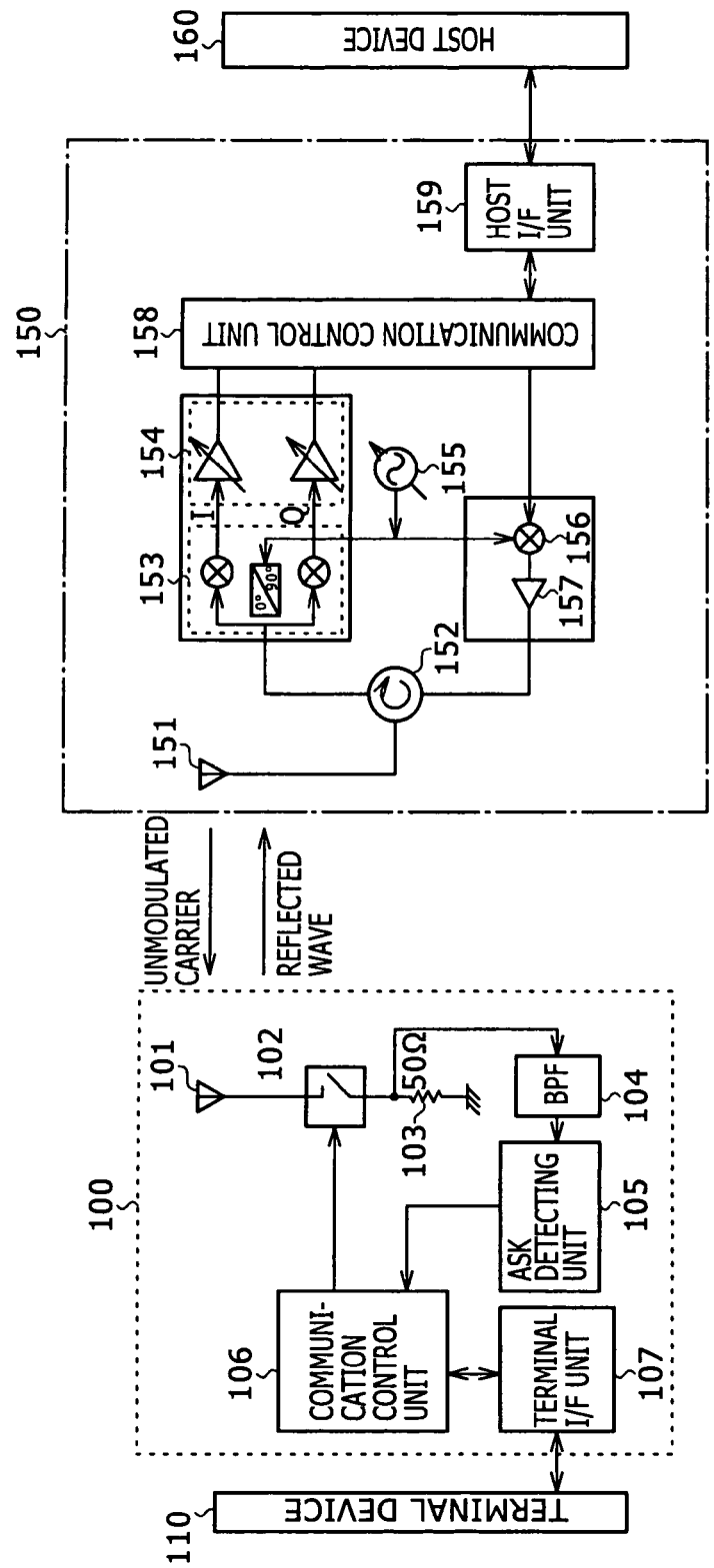
FIG. 1 is a diagram showing an example of configuration of a reflected wave transmission system according to one embodiment of the present invention.

FIG. 1 shows an example of configuration of a reflected wave transmission system according to one embodiment of the present invention.

The reflected wave communication system shown in the figure includes a reflected wave reader 150 and a host device 160 connected to the reflected wave reader 150, and a reflector 100 and a terminal device 110 connected to the reflector 100. Examples of the host device 160 include stationary type electric household appliances such as a television set, a monitor, a printer, a PC, a VTR, a DVD player, an audio player, and the like. Examples of the terminal device 110 include mobile type devices driven by a battery and thus desired to reduce power consumption as much as possible, such as a digital camera, a video camera, a portable telephone, a portable information terminal, a portable type audio reproducing device, and the like. In the embodiment of the present invention to be described below, an audio player is taken as an example of the host device. A mobile type device capable of collecting or recording and storing music or voice, such as a portable telephone, a portable information terminal, a portable type audio reproducing device, an IC recorder and the like is taken as an example of the terminal device.

The reflector 100 includes an antenna 101, an antenna switch 102, an antenna load 103, a band-pass filter 104, an ASK detecting unit 105, and a communication control unit 106. In the present embodiment, a 2.4 GHz band referred to as an ISM band is used as reflected wave frequencies.

When audio data collected by the terminal device 110 is transferred, the communication control unit 106 in the reflector 100 receives audio data from the terminal device 110 via a terminal interface unit 107, and turns on/off the antenna switch 102 connected to the antenna 101 according to a bit image of the data. For example, when the data is 1, the antenna switch 102 is turned on, and when the data is 0, the antenna switch 102 is turned off.

As shown in the figure, when the antenna switch 102 is on, the antenna 101 is terminated by the antenna load 103 of 50Ω, and when the antenna switch 102 is off, the antenna 101 is open. This operation acts to terminate a radio wave coming from a transfer destination (to be described later) when the antenna switch 102 is on, and reflect the radio wave when the antenna switch 102 is off. Therefore, at the transfer destination, the audio data can be read by detecting presence or absence of a reflected wave based on the transmitted radio wave. That is, the audio data is basically transmitted as the reflected wave of the radio wave from the transfer destination, the reflected wave being generated by variation in antenna load impedance which variation accompanies the on/off operation of the antenna switch 102.

A reflected wave signal from the reflector 100 is equivalent to an ASK modulated wave, and has a relatively low bit rate. Of course, in addition to ASK modulation, a PSK or a FSK modulation method can be applied even in the backscatter communication method. For example, by providing a plurality of reflection paths having different phases from each other, and switching the reflection paths according to transmission data, it is possible to realize a phase modulation method with a higher bit rate, such as BPSK, QPSK, eight-phase PSK modulation or the like.

The antenna switch 102 is generally formed by a gallium arsenide IC, which consumes a power of a few 10 µW or lower. Thus, the above-described communication method makes it possible to achieve non-contact, ultralow power consumption, and high speed radio audio transmission.

While the band-pass filter 104 and the ASK detecting unit 105 are used when receiving an ASK modulated delivery acknowledging signal from the reflected wave reader 150 as a transfer destination, the two blocks are not required in one-way transmission without transmission delivery acknowledgement. When delivery acknowledgement is performed, on the other hand, control therefor is performed by the communication control unit 106.

The band-pass filter (BPF) 104 is used to pass signals of frequencies in the 2.4 GHz band and attenuate signals in other frequency bands. A power consumption of the ASK detecting unit 105 which consumption is necessary for delivery acknowledgment is 30 mW or less.

Hence, the radio communication device shown in FIG. 1 can transmit data such as audio data or the like with an average power of 10 mW or lower in the case of the delivery acknowledgment method, and an average power of a few 10 µW in the case of the one-way transmission. This represents an overwhelming difference in performance as compared with an average power consumption of an ordinary wireless LAN.

Since audio data from the terminal device 110 is transmitted by a reflected wave, it is necessary to transmit an unmodulated carrier for creating the reflected wave from the host device 160 side. The reflected wave reader 150 includes a 2.4 GHz band antenna 151, a circulator 152, a receiving unit including a quadrature detection unit 153 and an AGC amplifier 154, a transmitting unit including a mixer 156 and a power amplifier 157, and a frequency synthesizer 155. A communication control unit 158 controls reflected wave communication operation in the transmitting unit and the receiving unit, and sends and receives data and commands to and from the host device 160 via a host interface unit 159.

An unmodulated carrier is transmitted from the transmitting unit by supplying a direct-current voltage from the communication control unit 158 to the mixer 156. The frequency of the transmitted unmodulated carrier is determined by the frequency of the frequency synthesizer controlled by the communication control unit 158. The present embodiment uses the 2.4 GHz band referred to as the ISM band. The unmodulated carrier output from the mixer 156 is amplified to a predetermined level by the power amplifier 157, and then transmitted from the antenna 151 via the circulator 152.

A modulated reflected wave signal from the reflector 100 which signal is obtained by modulating the unmodulated carrier has the same frequency as the unmodulated carrier transmitted from the reflected wave reader 150. The reflected wave signal is received by the antenna 151, and input to the above-mentioned receiving unit via the circulator 152. That is, since the same local frequency as in the transmission is input to the quadrature detection unit 153, an ASK modulating wave (or a PSK modulating wave) multiplied in the reflector 100 appears as output of the quadrature detection unit 153. However, since the received signal is different in phase from the local signal, modulating signals corresponding to the phase difference appear as an I-axis signal and a Q-axis signal.

The AGC amplifier 154 controls gain to an optimum value. The output signal of the AGC amplifier 154 is sent to the communication control unit 158. The communication control unit 158 demodulates digital data from the I-axis signal and the Q-axis signal. The correct data is decoded by the host device 160, and output as audio from a speaker, for example.

When acknowledging delivery of data from the terminal device 110, the communication control unit 158 transfers to the mixer 156 digital data for positive response ACK (Acknowledgement) when the received packet data is correct, or digital data for negative response NACK (Negative Acknowledgement) when the received packet data has an error, so that the digital data is subjected to ASK modulation. Whether the data is correct or not is determined by CRC (Cyclic Redundancy Check) code added to an image data packet.

Figure 2:
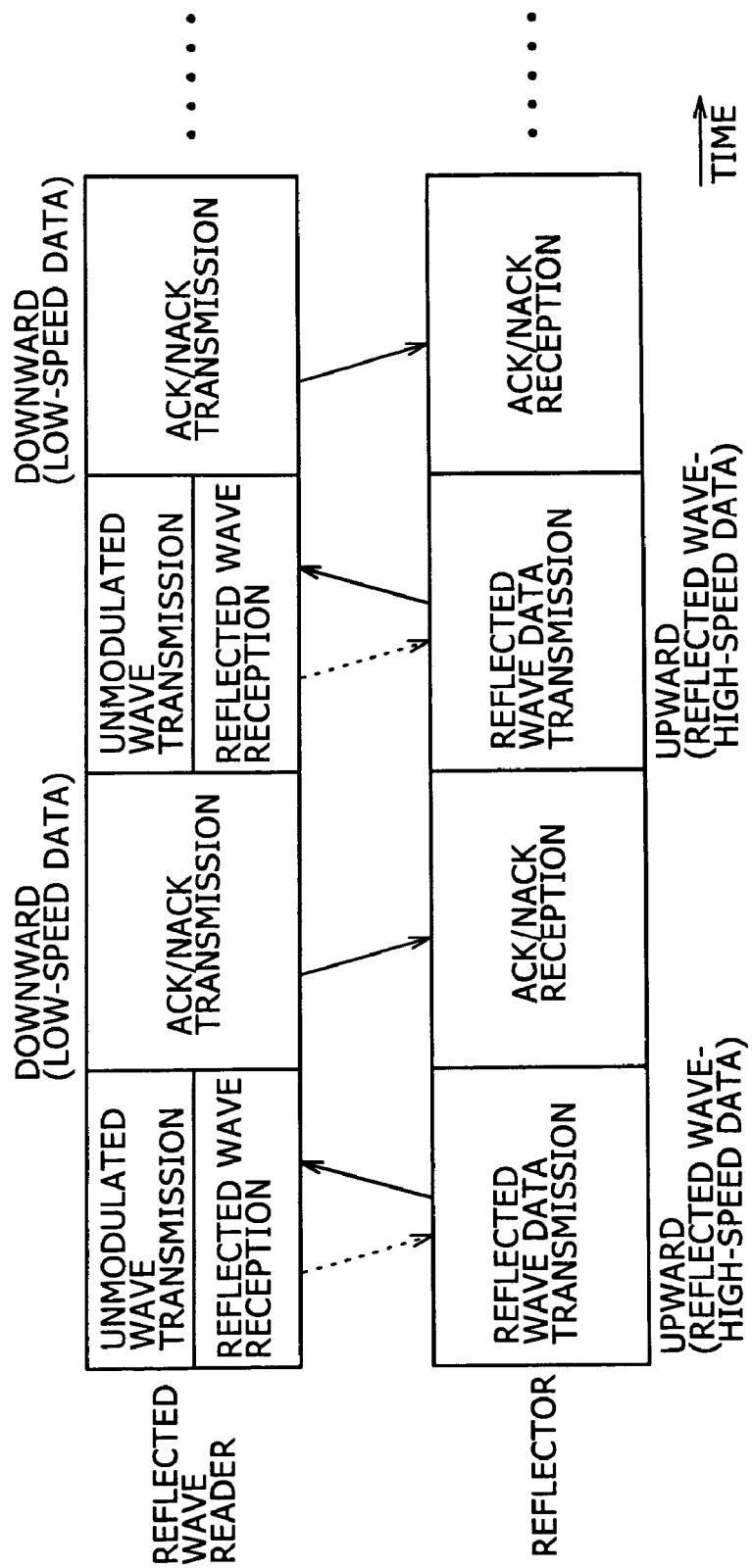
FIG. 2 is a diagram representing an example of operation of the reflected wave transmission system employing a TDD (Time Division Duplex) method.

FIG. 2 represents an example of operation of the reflected wave transmission system employing a TDD (Time Division Duplex) method. Since reflection is used in the present system, the reflected wave reader 150 repeats a state of transmitting an unmodulated carrier and receiving a reflected wave and a state of transmitting data by a modulated wave from the reflected wave reader 150 itself. The reflector 100 repeats a state of superimposing data on the unmodulated carrier and returning the data as the reflected wave and a next state of receiving the modulated wave from the reflected wave reader 150 side.

The reflected wave transmission system is an asymmetric transmission system in which the speed of upward transmission from the reflector 100 to the reflected wave reader 150 is higher than the speed of downward transmission from the reflected wave reader 150 to the reflector 100. Hence, as described above, in the mode of communication in which transmission from the side of the terminal device 110, that is, the reflector 100 accounts for most of the communication, it is possible to increase transmission efficiency and achieve non-contact, low power consumption, and high speed data transmission.

As described above, in the reflected wave transmission system, the antenna switch used to modulate a reflected wave by changing antenna load impedance, for example, is generally formed by a gallium arsenide IC, which consumes a power of a few 10 µW or lower. Data transmission can be performed with an average power of 10 mW or lower in the case of the delivery acknowledgment method, and an average power of a few 10 µW in the case of one-way transmission. This represents an overwhelming difference in performance as compared with an average power consumption of an ordinary wireless LAN (see the specification of Japanese Patent Application No. 2003-291809, for example). Thus, by using reflected wave transmission, the battery-driven mobile device such as a portable telephone, a portable information terminal, a portable type audio reproducing device, an IC recorder and the like can reduce power consumption in the operation of transferring data such as voice or music contents, and thus greatly extend the life of the battery of the terminal device 110.

Figure 3:
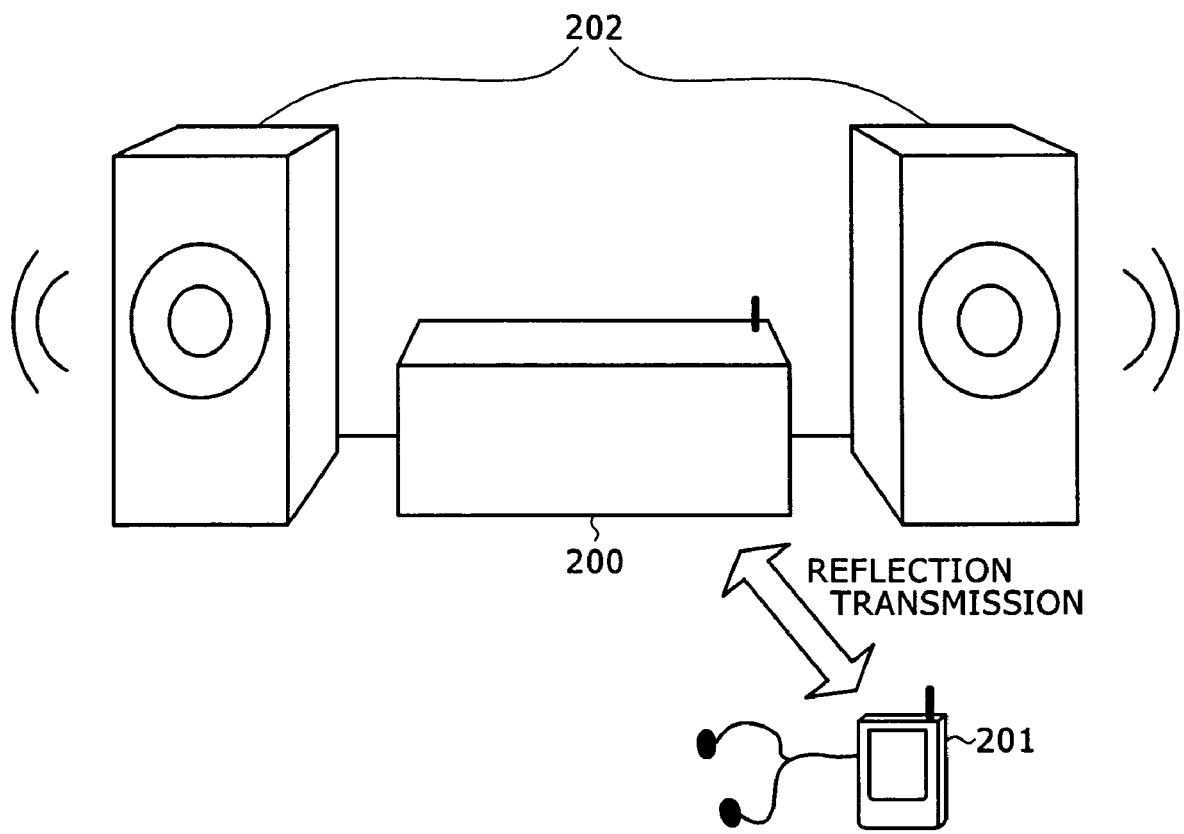
FIG. 3 is a diagram illustrating an example of use of an audio reproducing system using a reflected wave communication method according to an embodiment of the present invention.

FIG. 3 illustrates an example of use of an audio reproducing system using the reflected wave communication method according to an embodiment of the present invention.

Reference numeral 200 denotes an audio receiving and reproducing device corresponding to the host device. The audio receiving and reproducing device 200 has a reflected wave reader function for receiving and demodulating a reflected wave signal according to the reflected wave communication method, and an audio reproducing function for decoding and reproducing the received signal as audio data.

Reference numeral 202 denotes a speaker. The speaker 202 outputs as audio the audio reproduced signal decoded by the audio reproducing function.

Reference numeral 201 denotes an audio transmitting device corresponding to the terminal device. The audio transmitting device 201 has a reflector function in the reflected wave communication method for transmitting audio data stored at hand as a modulated reflected wave signal. The audio transmitting device 201 is a portable telephone, a portable information terminal, a portable audio reproducing device, an IC recorder or the like. Further, the audio transmitting device 201 has an audio reproducing function and an audio recording and storing function.

The example shown in the figure represents an image in which the audio transmitting device 201 is situated at a distance of a few meters, which is a communication range in the reflected wave communication method, from the audio receiving and reproducing device 200, and a user listens to voice or music from the speaker 202 by a similar operation to that when the user carries the audio transmitting device 201. For example, when the user gives an instruction for audio reproduction on the audio transmitting device 201, specified audio contents are transmitted to the audio receiving and reproducing device 200 by a reflected wave, and the audio receiving and reproducing device 200 demodulates and decodes the reflected wave signal, performs an audio reproduction process, and outputs audio from the speaker 202. The operational feeling of the user is not different from that when the user listens to music through an earphone attached to the audio transmitting device 201.

Figure 4:
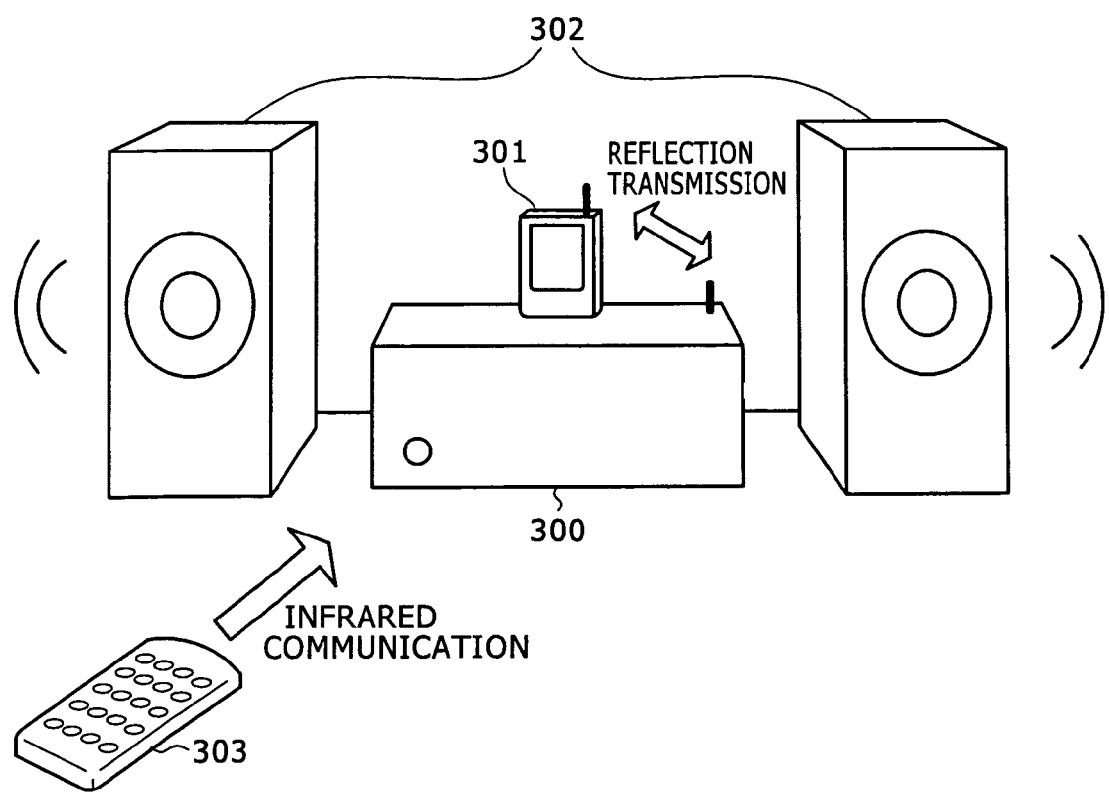
FIG. 4 is a diagram illustrating an example of use of an audio reproducing system using a reflected wave communication method according to an embodiment of the present invention.

FIG. 4 illustrates another example of use of an audio reproducing system using the reflected wave communication method according to an embodiment of the present invention.

Reference numeral 300 denotes an audio receiving and reproducing device corresponding to the host device. The audio receiving and reproducing device 300 has a reflected wave reader function for receiving and demodulating a reflected wave signal according to the reflected wave communication method, an audio reproducing function for decoding and reproducing the received signal as audio data, and an infrared receiving function for receiving an infrared command.

Reference numeral 302 denotes a speaker. The speaker 302 outputs as audio the audio reproduced signal decoded by the audio reproducing function.

Reference numeral 301 denotes an audio transmitting device corresponding to the terminal device. The audio transmitting device 301 has a reflector function in the reflected wave communication method for transmitting audio data stored at hand as a modulated reflected wave signal. The audio transmitting device 301 is a portable telephone, a portable information terminal, a portable audio reproducing device, an IC recorder or the like. Further, the audio transmitting device 301 has an audio reproducing function and an audio recording and storing function.

Reference numeral 303 denotes an infrared remote controller. The infrared remote controller 303 has a function of transmitting an operation command corresponding to a button operation by the user as an infrared signal.

In the example shown in the figure, the audio transmitting device 301 is placed in the vicinity of the audio receiving and reproducing device 300, and is separated at a distance from the user holding the remote controller 303. The example shown in the figure represents an image in which the user performs an operation using the remote controller 303 and listens to voice or music from the speaker. For example, when the user gives an instruction for audio reproduction via the remote controller 303, specified audio contents are transmitted from the audio transmitting device 301 to the audio receiving and reproducing device 300 by a reflected wave, and the audio receiving and reproducing device 300 demodulates and decodes the reflected wave signal, performs an audio reproduction process, and outputs audio from the speaker 302. Although the reproduced audio contents are stored in the audio transmitting device 301 rather than the audio receiving and reproducing device 300, the operational feeling of the user is not different from that when the user operates the audio receiving and reproducing device 300 by the remote controller.

The use example as shown in FIG. 4 is suitable when a position where the user performs operation is outside the communication range of the reflected wave communication method, and is a position (for example 5 to 6 m) where infrared communication is possible.

Figure 5:
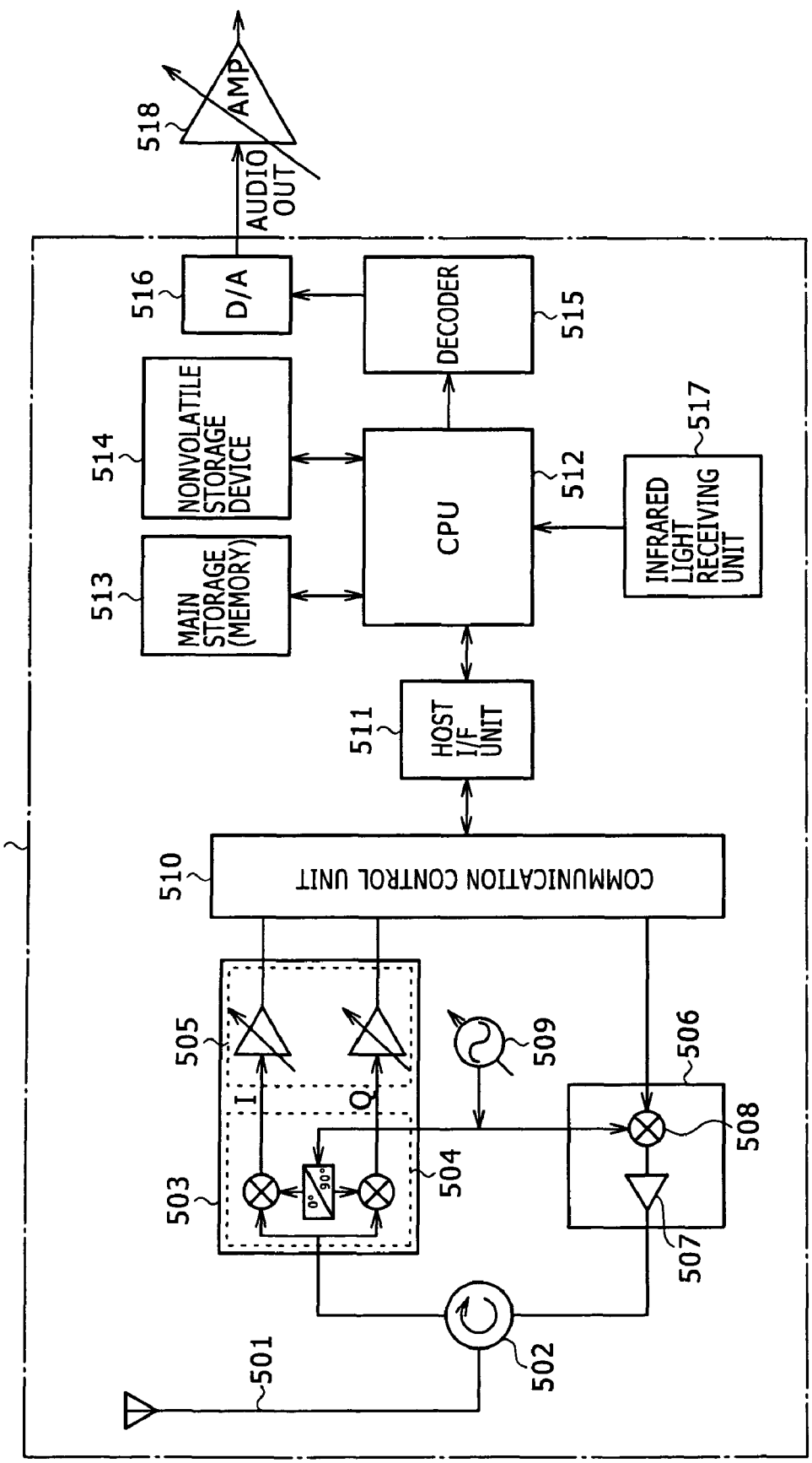
FIG. 5 is a diagram showing an internal configuration of an audio receiving and reproducing device.

FIG. 5 shows an internal configuration of the audio receiving and reproducing device shown in FIG. 3 and FIG. 4. The audio receiving and reproducing device is a stationary type host device that stores voice and music contents and decodes and reproduces data, such for example as a PC and a stationary type audio reproducing device.

The audio receiving and reproducing device 500 has the function of a reflected wave reader in the reflected wave communication method. This function is realized by an antenna 501, a circulator 502, a receiving unit 503, a transmitting unit 506, a frequency synthesizer 509, a communication control unit 510, and a host interface unit 511. Further, the receiving unit 503 includes a quadrature detection unit 504 and an AGC amplifier 505. The transmitting unit 506 includes a mixer 508 and a power amplifier 507.

An unmodulated carrier is transmitted from the audio receiving and reproducing device 500 by supplying a direct-current voltage from the communication control unit 510 to the mixer 508. The frequency of the transmitted unmodulated carrier is determined by the frequency of the frequency synthesizer controlled by the communication control unit 510. The present embodiment uses the 2.4 GHz band referred to as the ISM band. The unmodulated carrier output from the mixer 508 is amplified to a predetermined level by the power amplifier 507, and then transmitted from the antenna 501 to a radio transmission line via the circulator 502.

A reflector side not shown in the figure receives the unmodulated carrier, and returns a reflected wave signal modulated according to transmission data. In the present embodiment, the reflected wave from the reflector has the same frequency as the unmodulated carrier transmitted from the audio receiving and reproducing device 500. However, the subject matter of the present invention is not limited to this; a method of shifting the reflected wave to another frequency can be applied. For example, the specification of Japanese Patent Application No. 2004-140580 already assigned to the present applicant discloses a reflected wave communication system in which a reception frequency $f_O$ is shifted by a predetermined center frequency $f_S$ in one of a positive direction and a negative direction on a reflector side, and then a reflected wave signal is returned.

The reflected wave from the reflector is received by the antenna 501, and input to the receiving unit 503 via the circulator 502. Since the same local frequency as in the transmission is input to the quadrature detection unit 504, an ASK modulating wave or a QPSK modulating wave multiplied in the reflector side appears as output of the quadrature detection unit 504. However, since the received signal is different in phase from the local signal, modulating signals corresponding to the phase difference appear as an I and a Q. The AGC amplifier 505 controls gain to an optimum value. The output signal of the AGC amplifier 505 is sent to the communication control unit 510.

The communication control unit 510 demodulates digital data from the two I and Q signals. Then, the correctly demodulated data is transferred to a CPU 512 via the host interface unit 511.

When acknowledging delivery of data transmitted from the reflector, the communication control unit 510 transfers to the mixer 508 a positive response ACK (Acknowledgement) as digital data when the received packet data is correct, or a negative response NACK (Negative Acknowledgement) as digital data when the received packet data has an error, so that the digital data is subjected to ASK modulation. Whether the data is correct or not is determined by CRC (Cyclic Redundancy Check) code added to an audio data packet on the reflector side, for example.

After the CPU 512 thus receives the audio data from the reflector, the audio receiving and reproducing device 500 can temporarily store the audio data in a main storage 513 or a nonvolatile storage device (which is a hard disk or a flash memory, and is not limited in this case) 514, and transfer the data to a decoder 515. This is effective when the audio data is transferred en bloc from the audio transmitting device by file transfer.

On the other hand, when the audio data from the audio transmitting device is a stream, the received data may be transferred to the decoder 515 as appropriate. The main storage 513 and the nonvolatile storage device 514 are not only used to retain the audio data but also used to retain a software program and as a work area. When receiving the audio data from the CPU 512, the decoder 515 decodes audio compressed data of the audio data, and thereby converts the data into PCM code or the like. A D/A converter 516 converts a digital signal of the PCM code or the like from the decoder 515 into an analog signal, and then outputs the analog signal to an amplifier 518. There have recently been cases where the amplifier 518 is included in a speaker, and thus the amplifier 518 is not essential in the audio receiving and reproducing device.

An infrared light receiving unit 517 receives an infrared signal transmitted from the infrared remote controller, and sends the infrared signal to the CPU 512. This unit is used to realize the use example shown in FIG. 4. For example, the audio transmitting device is placed in the vicinity of the audio receiving and reproducing device 500, and is separated at a distance from the user holding the infrared remote controller. When the user gives an instruction for audio reproduction via the remote controller, specified audio contents are transmitted to the audio receiving and reproducing device 500 by a reflected wave, and the audio receiving and reproducing device 500 demodulates and decodes the reflected wave signal, performs an audio reproduction process, and outputs audio from the speaker 502.

Figure 6:
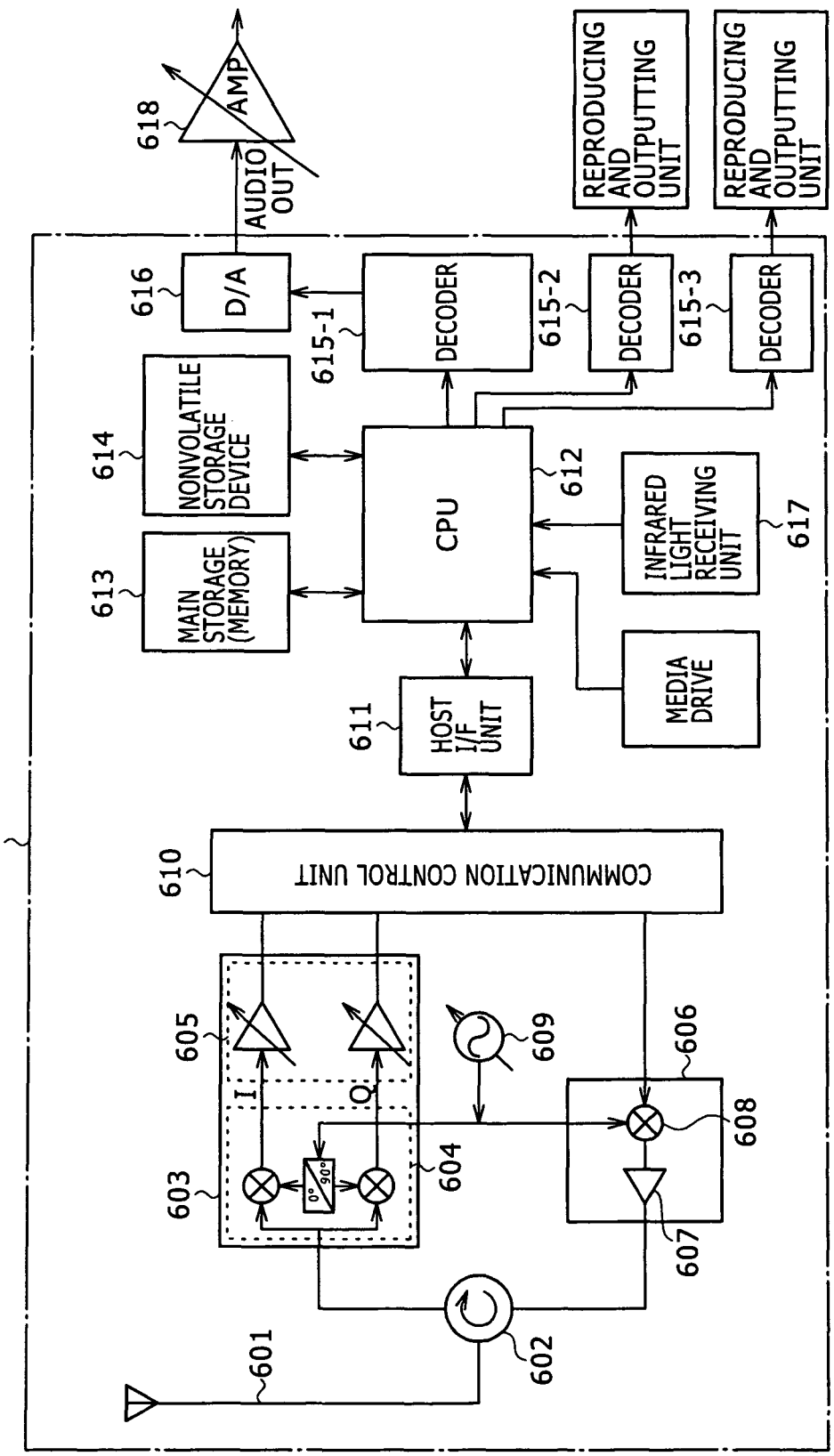
FIG. 6 is a diagram showing an example of configuration of a content receiving and reproducing device capable of receiving, decoding, reproducing, and outputting various media types of contents.

As described above, the audio receiving and reproducing device 500 shown in FIG. 5 is configured to decode and reproduce audio data transmitted from the audio transmitting device, and output the audio data as audio. FIG. 6 shows, as a modification of the audio receiving and reproducing device 500, an example of configuration of a content receiving and reproducing device 600 capable of receiving, decoding, reproducing, and outputting various media types of contents including audio data.

A main difference between the content receiving and reproducing device 600 and the audio receiving and reproducing device 500 lies in that the content receiving and reproducing device 600 has not only an audio reproducing function for decoding, reproducing, and outputting audio data but also decoders corresponding to other media types requiring different encoding and decoding methods and one or more media content reproducing functions for reproducing and outputting decoded data.

A CPU 612 detects a media type or an encoding and decoding method of a received content, and starts a decoder corresponding to the received content to be decoded to decode, reproduce, and output the content.

The content receiving and reproducing device 600 further includes a media drive for being loaded with portable media such as CDs, DVDs and the like and reading data. The content receiving and reproducing device 600 can detect an encoding and decoding method of a read medium, and start a corresponding decoder to decode, reproduce, and output a content.

Figure 7:
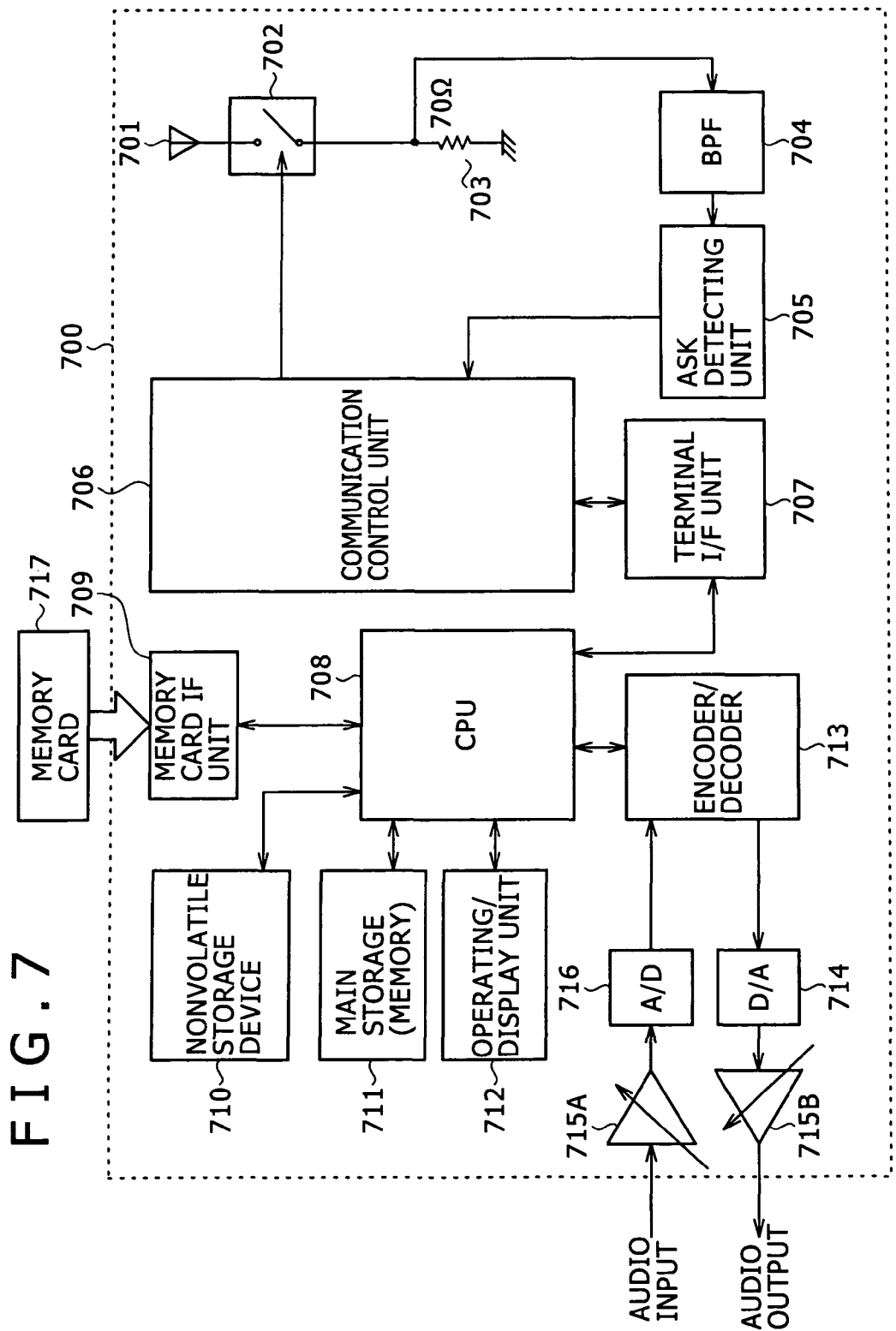
FIG. 7 shows an internal configuration of an audio reproducing device.

FIG. 7 shows an internal configuration of the audio transmitting device shown in FIG. 3 and FIG. 4. The audio transmitting device is a mobile device collecting voice or music contents, such for example as a portable telephone, a portable information terminal, a portable type audio reproducing device, or an IC recorder.

The audio transmitting device 700 has the function of a reflector in the radio reflected wave communication method. This function is realized by an antenna 701, an antenna switch 702, an antenna load 703, a band-pass filter 704, an ASK detecting unit 705, a communication control unit 706, and a terminal interface unit 707. The present embodiment uses the 2.4 GHz band referred to as the ISM band as frequencies.

When data transfer is performed, the communication control unit 706 receives audio data to be transmitted from a CPU 708 via the terminal interface unit 707, and performs on/off operation of the antenna switch 702 connected to the antenna 701. This operation acts to terminate a radio wave transmitted from the reflected wave reader when the antenna switch 702 is on, and reflect the radio wave when the antenna switch 702 is off. For example, when the bit value of the data to be transmitted is 1, the antenna switch 702 is turned on, and the antenna 701 is terminated by the antenna load 703 of 50Ω. When the bit value of the data to be transmitted is 0, the antenna switch 702 is turned off, and the antenna 701 is open.

As described above, the data to be transmitted is basically transmitted by modulating the reflected wave of the radio wave from the transfer destination, the reflected wave being generated by variation in antenna load impedance as a result of the on/off operation of the antenna switch 702. Such modulation of the reflected wave is equivalent to ASK modulation. However, it is possible to create a QPSK modulated wave depending on the structure of the antenna switch 702.

The antenna switch 702 is generally formed by a gallium arsenide IC, which consumes a power of a few 10 μW or lower. Thus, audio data transmission with ultralow power consumption can be realized. Communication speed basically depends on the speed of on/off switching of the antenna switch 702 (that is, an available frequency band). In a generally available band of a 2.4 GHz RFID system, data transmission can be performed at a high speed of about 10 Mbps when ASK modulation is used and at a high speed of about 20 Mbps when QPSK modulation is used.

The band-pass filter 704 and the ASK detecting unit 705 are used when receiving an ASK modulated delivery acknowledging signal, a beacon signal and other control signals and a data signal from the reflected wave reader.

The data received from the reflected wave reader is analyzed by the communication control unit 706, and operation in accordance with a communication protocol is performed. When a result of the analysis by the communication control unit 706 indicates that the data received from the reflected wave reader is a data packet, the data packet can be transmitted as a down data signal to the CPU 708 via the terminal interface unit 707. This can be used when the audio receiving and reproducing device transmits control data for fast forward, fast rewind, search and the like to the audio transmitting device via the above-described remote controller, for example. Receiving the control data, the CPU 708 controls audio data to be transmitted as required.

The audio transmitting device thus transmits audio data using the reflected wave communication method. Functions of a portable type audio recording and reproducing device will be described in the following. However, parts that do not need to be implemented depending on the form of an application are included.

A memory card interface unit 709 is a controller implementing an interface protocol between an external memory card 717 and the CPU 708. The memory card interface unit 709 is for example a controller for a compact flash, "Card-Bus" according to the PC Card Standard developed by PCM- CIA/JEIDA, and the like. The external memory card 717 writes or reads voice or music audio data at a request of the CPU 708.

A nonvolatile storage device (which is a hard disk, a flash memory or the like, and is not limited in this case) 710 is a built-in type voice or music audio data retaining area. The nonvolatile storage device 710 plays similar roles to those of the external memory card 717. The nonvolatile storage device 710 is also used as a software program retaining area.

A main storage 711 can be used as a temporary audio data retaining area, but is mainly used as a work area for a software program. An operating/display unit 712 is a user interface function including buttons for operation by a user, an LCD display for displaying information, and the like.

When the audio transmitting device has a recording function (an IC recorder or the like), an audio signal input as an analog signal is amplified by an amplifier 715A, output to an analog-to-digital converter 716, and then converted into a digital signal of PCM code or the like. Further, supplied with the digital signal from the analog-to-digital converter 716, an encoder/decoder 713 performs audio compression, and then outputs the result as audio data to the CPU 708.

The CPU 708 stores the audio data in one of the memory card 717, the nonvolatile storage device 710, and the main storage 711, or may perform reflected wave communication via the terminal interface unit 707 to immediately transmit the audio data to the audio receiving and reproducing device.

When the audio transmitting device has a reproducing function (a portable type audio player or the like), the CPU 708 reads audio data stored in one of the memory card 717, the nonvolatile storage device 710, and the main storage 711, and then sends the audio data to the encoder/decoder 713. Receiving the audio data from the CPU 708, the encoder/decoder 713 decodes audio compressed data of the audio data, and thereby converts the data into PCM code or the like. A digital-to-analog converter 714 converts a digital signal of the PCM code or the like from the encoder/decoder 713 into an analog signal, and then outputs the analog signal to an amplifier 715B.

Figure 8:
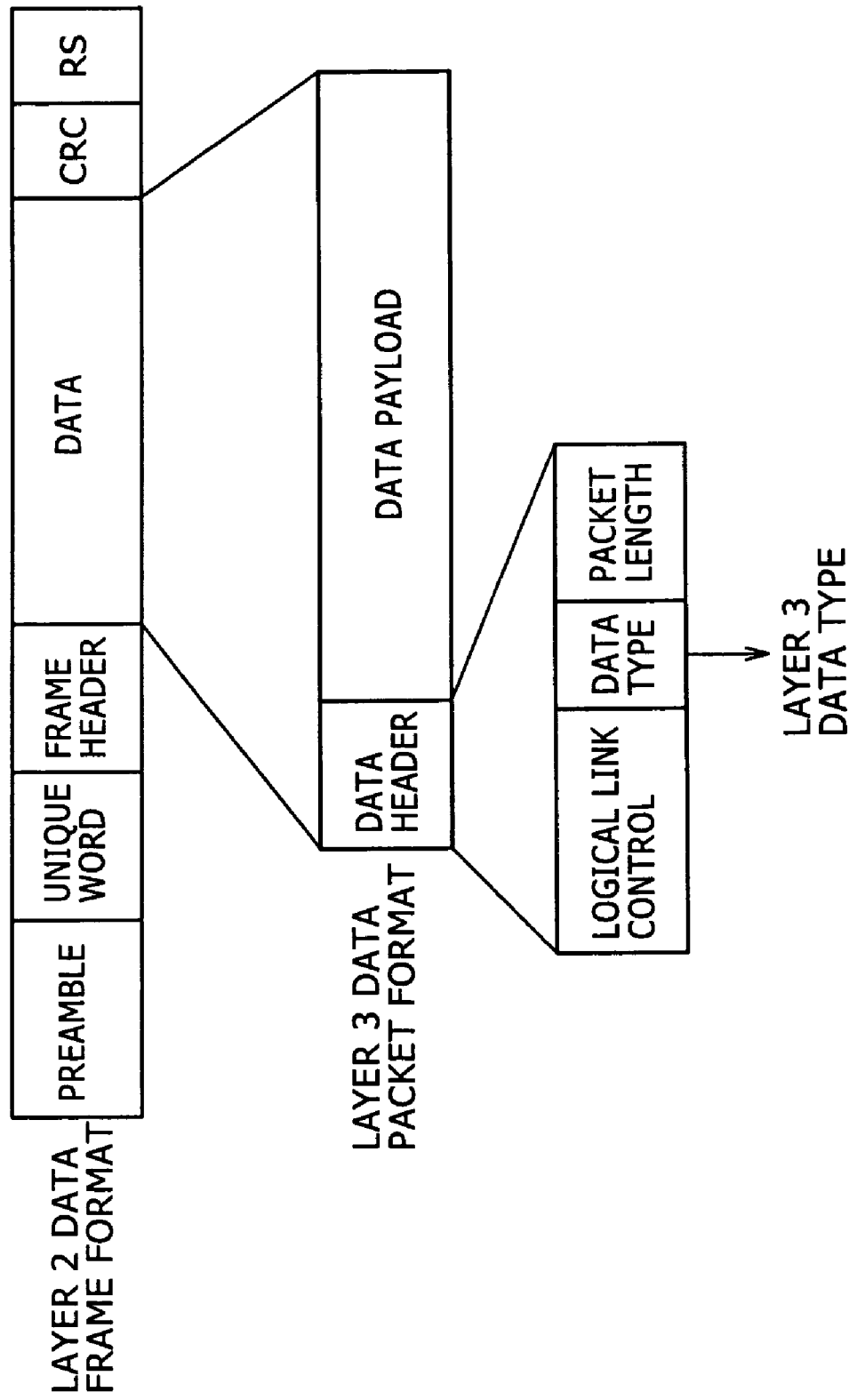
FIG. 8 is a diagram showing an example of the format of a data frame used in reflected wave transmission according to an embodiment of the present invention.

FIG. 8 shows an example of the format of a data frame used in reflected wave transmission according to the present embodiment. As shown in the figure, the data frame has a header part including a preamble part, a unique word, and a frame header, the header part is followed by a data part, and a CRC and RS for correcting errors in the frame are added in the rear of the data part. The data part includes a data header and a data payload. The data header includes logical link control information, a data type, and a packet length.

The reflected wave communication method does not define a packet format over Layer 3, and is not specifically concerned with kinds of data packets transmitted and received between the reflected wave reader and the reflector. Therefore, when audio data is put in a data packet in reflected wave transmission according to the present embodiment, it is necessary to distinguish the audio data from other data (for example image data, moving image data, and a PC file). In the example shown in FIG. 8, a layer 3 packet format for thus distinguishing the data packet is employed. An example of a layer 2 data frame format in the reflected wave communication method is shown in the following.

TABLE 1

| Frame Component | Description |
| --- | --- |
| Preamble | A clock synchronization pattern at the frame head |

TABLE 1-continued

| Frame Component | Description |
| --- | --- |
| Unique Word | A frame synchronization pattern |
| Frame Header | Frame type: Data Frame |
| | Various parameters associated with the frame type |
| | Frame composition information of an up data packet |
| | Ack information for a down data packet |
| | The number of bytes of an information area |
| | Header error detecting data |
| Data | Payload |
| CRC | Error detecting data |
| RS | Error correcting data |

An example of a layer 3 data packet format in the reflected wave communication method is shown in the following.

TABLE 2

| Packet Component | Description |
| --- | --- |
| Logical Link Control | Logical link control information (a transmission source, a transmission destination, a logical number, retransmission control data and the like) |
| Data Type | Information on the type of the data packet being transmitted and received (image, audio, moving image, text, remote controller, etc.) |
| Packet Length | Packet length |
| Data Payload | Main body of the packet |

While these are mere examples, information corresponding to the Data Type, in particular, is essential.

Within the audio receiving and reproducing device 500/600, the Data Payload is processed according to the Data Type.

For example, when the Data Type indicates a medium of audio, an image, a moving image or the like, the CPU 512/612 starts a decoder for performing an encoding/decoding process corresponding to the media type. Then, without the intervention of a higher layer (application) in the communication protocol, the Data Payload is supplied to the decoder to decode the data, and then contents are reproduced and output from an output device such as a speaker, a display or the like.

When the Data Type indicates a remote controller command or another computer data/command, a notification thereof is made to the higher layer (application) in the communication protocol to perform a required data process.

Figure 9:
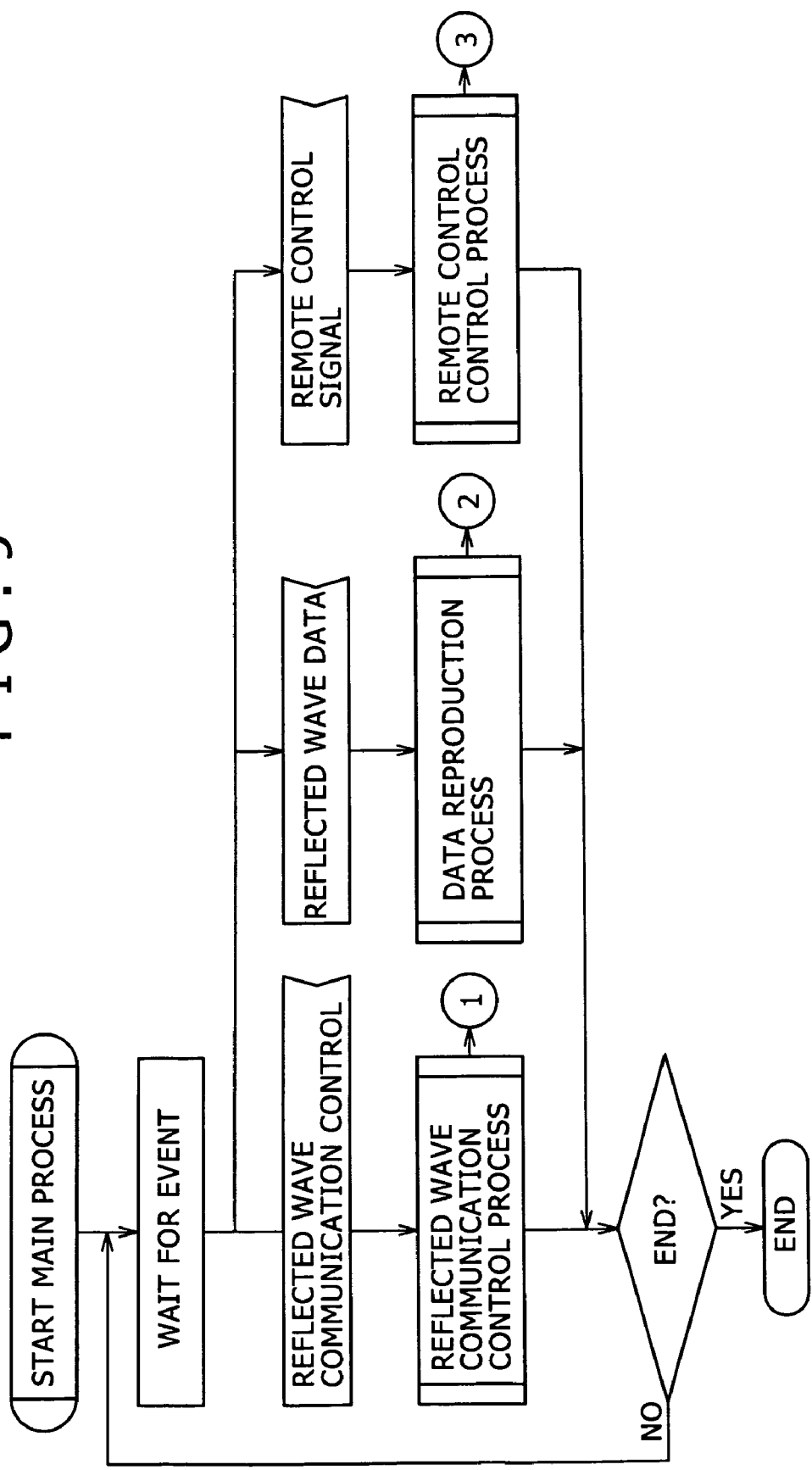
FIG. 9 is a flowchart of a control procedure of a system as a whole including an audio reproducing device having a reflector, an audio receiving and reproducing device having a reflected wave reader, and a remote controller issuing an infrared command.

FIG. 9 represents, in the form of a flowchart, a control procedure of the system as a whole including the audio reproducing device having the reflector, the audio receiving and reproducing device having the reflected wave reader, and the remote controller issuing an infrared command.

The audio receiving and reproducing device has three processing phases of a reflected wave communication controlling process, a data reproducing process, and a remote controller controlling process.

The audio receiving and reproducing device stands by in an event wait state, and starts the reflected wave communication controlling process when reflected wave communication control is triggered. The audio receiving and reproducing device starts the data reproducing process when reflected wave data in response to an unmodulated carrier transmitted by the audio receiving and reproducing device arrives at the audio receiving and reproducing device. The audio receiving and reproducing device starts the remote controller controlling process when a remote controller signal from the infrared remote controller arrives at the audio receiving and reproducing device.

Figure 10:
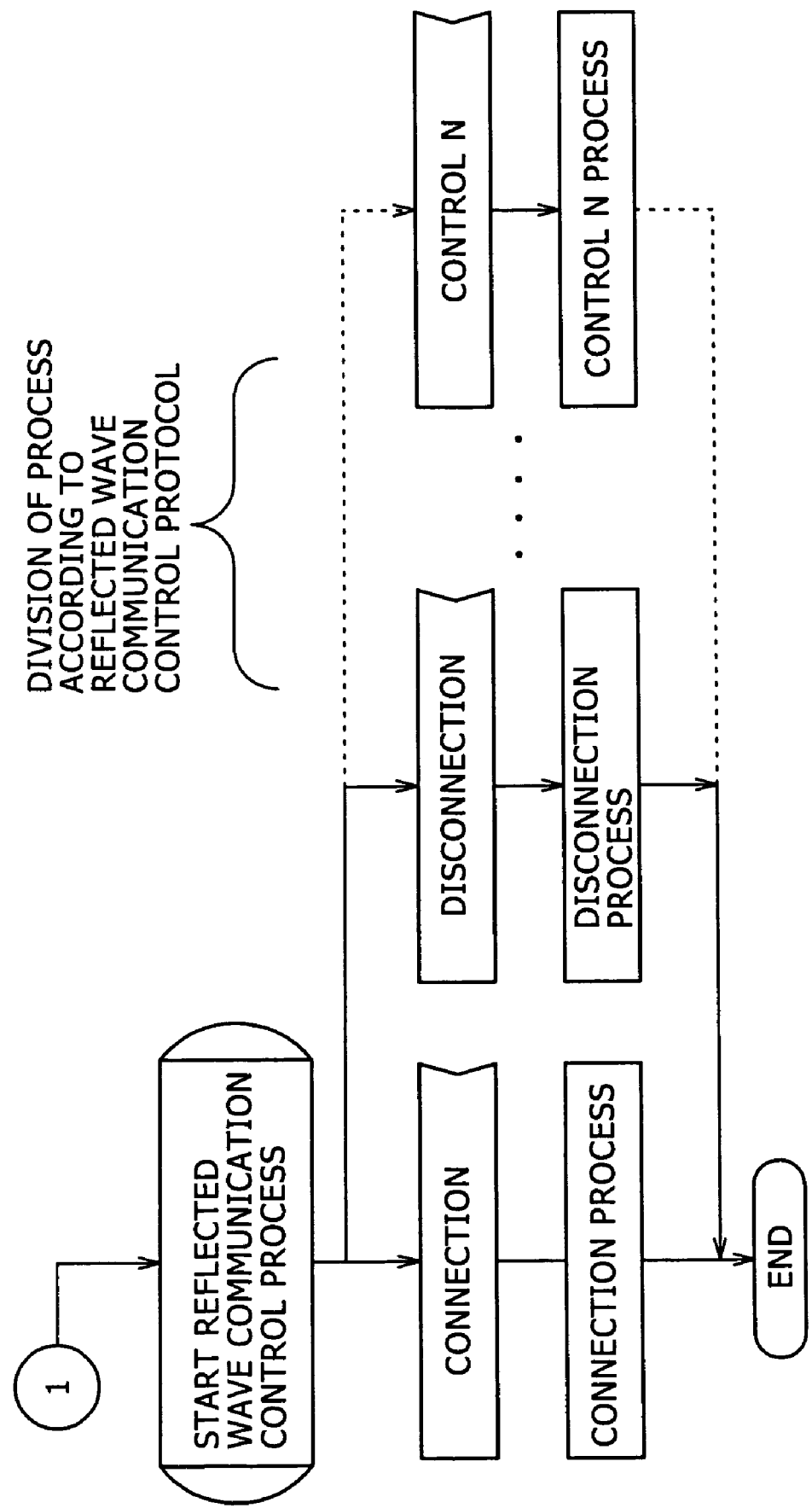
FIG. 10 is a flowchart of the procedure of a reflected wave communication controlling process.

FIG. 10 represents the procedure of the reflected wave communication controlling process in the form of a flowchart.

In this case, the process is divided according to a reflected wave communication controlling protocol. Specifically, at a time of connecting a reflected wave transmission line, a connection process including a predetermined authentication procedure and the like is performed. A disconnection process is performed at a time of disconnection. In an Nth control procedure, a control N process is performed.

Figure 11:
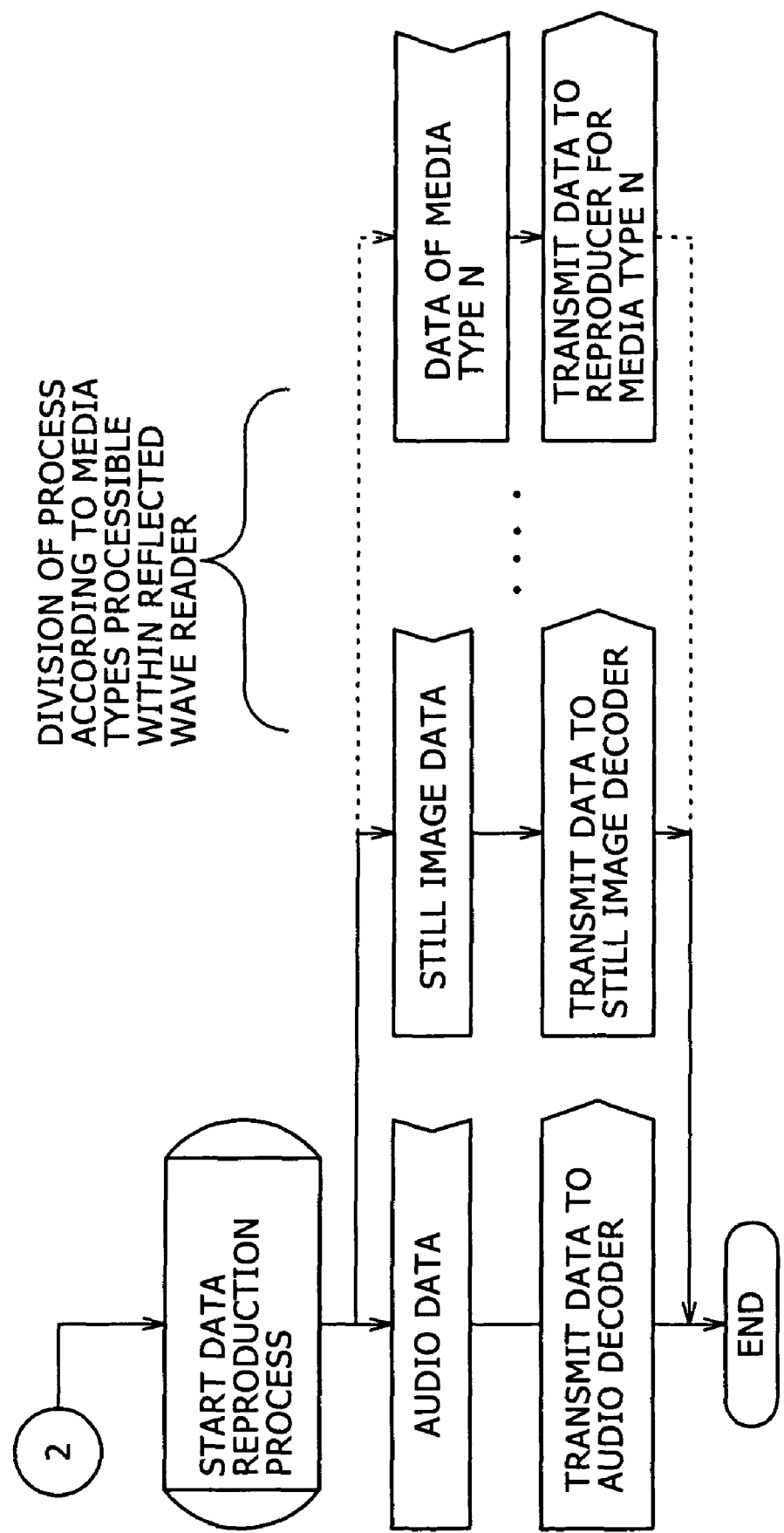
FIG. 11 is a flowchart of the procedure of a data reproducing process.

FIG. 11 represents the procedure of the data reproducing process in the form of a flowchart.

The data reproducing process is started in response to a reflected wave signal returned from the side of the audio reproducing device having the reflector in response to an unmodulated carrier transmitted from the audio receiving and reproducing device. In this case, the process is divided according to kinds of data that can be processed, that is, decoded within the audio receiving and reproducing device.

For example, when audio data is received and demodulated as a reflected wave signal, the received signal is output to an audio decoder to decode the data and then reproduce and output the audio. When still image data of a JPEG or the like is received and demodulated as a reflected wave signal, the received signal is output to a still image (JPEG) decoder to decode the data and then display and output the still image. Similarly, when data of a media type N is received and demodulated as a reflected wave signal, the received signal is output to a decoder for the media type N to reproduce and output the data.

Figure 12:
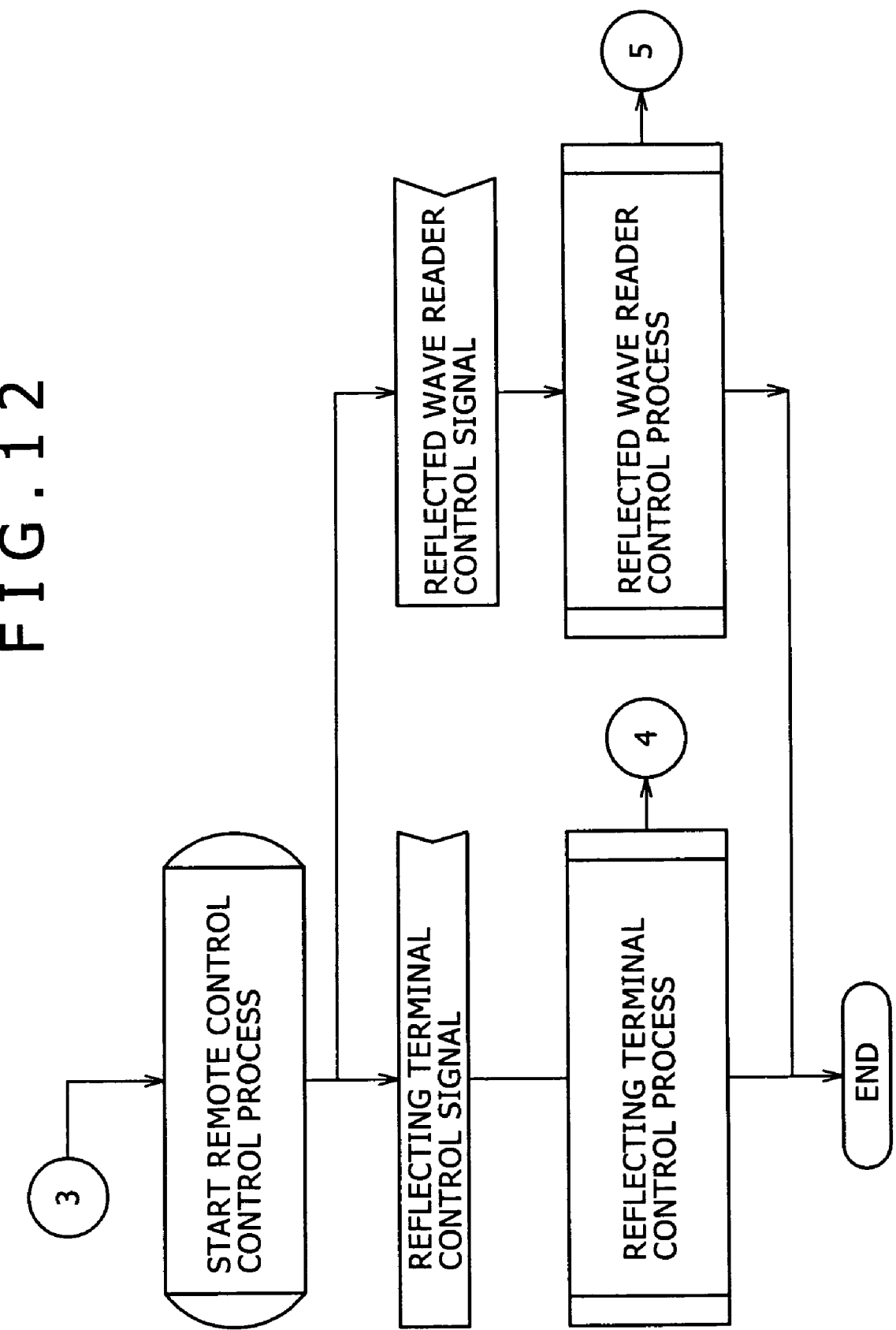
FIG. 12 is a flowchart of the procedure of a remote controller controlling process.

FIG. 12 represents the procedure of the remote controller controlling process in the form of a flowchart.

In the remote controller controlling process, a process corresponding to a remote controller command received in the form of an infrared signal is started. For example, when a reflecting terminal control signal is received as a remote controller signal, a controlling process corresponding to the command is performed on the audio reproducing device having the reflector. When a reflected wave reader control signal is received as a remote controller signal, a controlling process corresponding to the command is performed on the audio receiving and reproducing device having the reflected wave reader.

Figure 13:
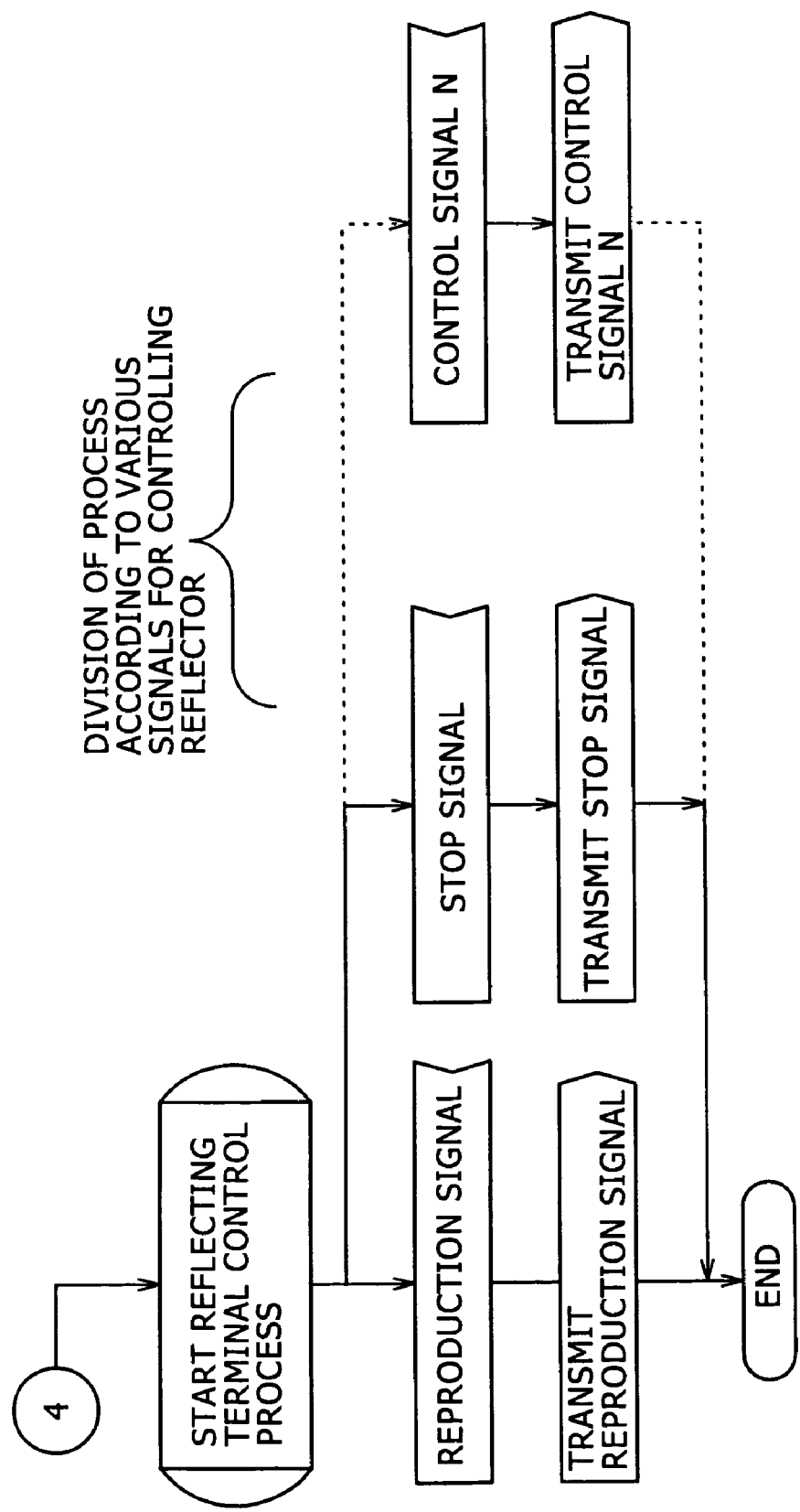
FIG. 13 is a flowchart of a procedure for performing a remote controller command process on the audio reproducing device having the reflector.

FIG. 13 represents, in the form of a flowchart, a procedure for performing a remote controller command process on the audio reproducing device having the reflector.

In this case, the process is divided according to various signals for controlling the reflector. For example, when receiving a remote controller command for reproduction of the audio reproducing device, the audio receiving and reproducing device outputs a reproduction signal in the form of an ASK modulated radio signal to the audio reproducing device having the reflector. When receiving a remote controller command to stop the reproduction of the audio reproducing device, the audio receiving and reproducing device outputs a stop signal in the form of an ASK modulated radio signal to the audio reproducing device having the reflector. When receiving a remote controller command for an Nth control of the audio reproducing device, the audio receiving and reproducing device outputs a control signal N in the form of an ASK modulated radio signal to the audio reproducing device having the reflector.

Figure 14:
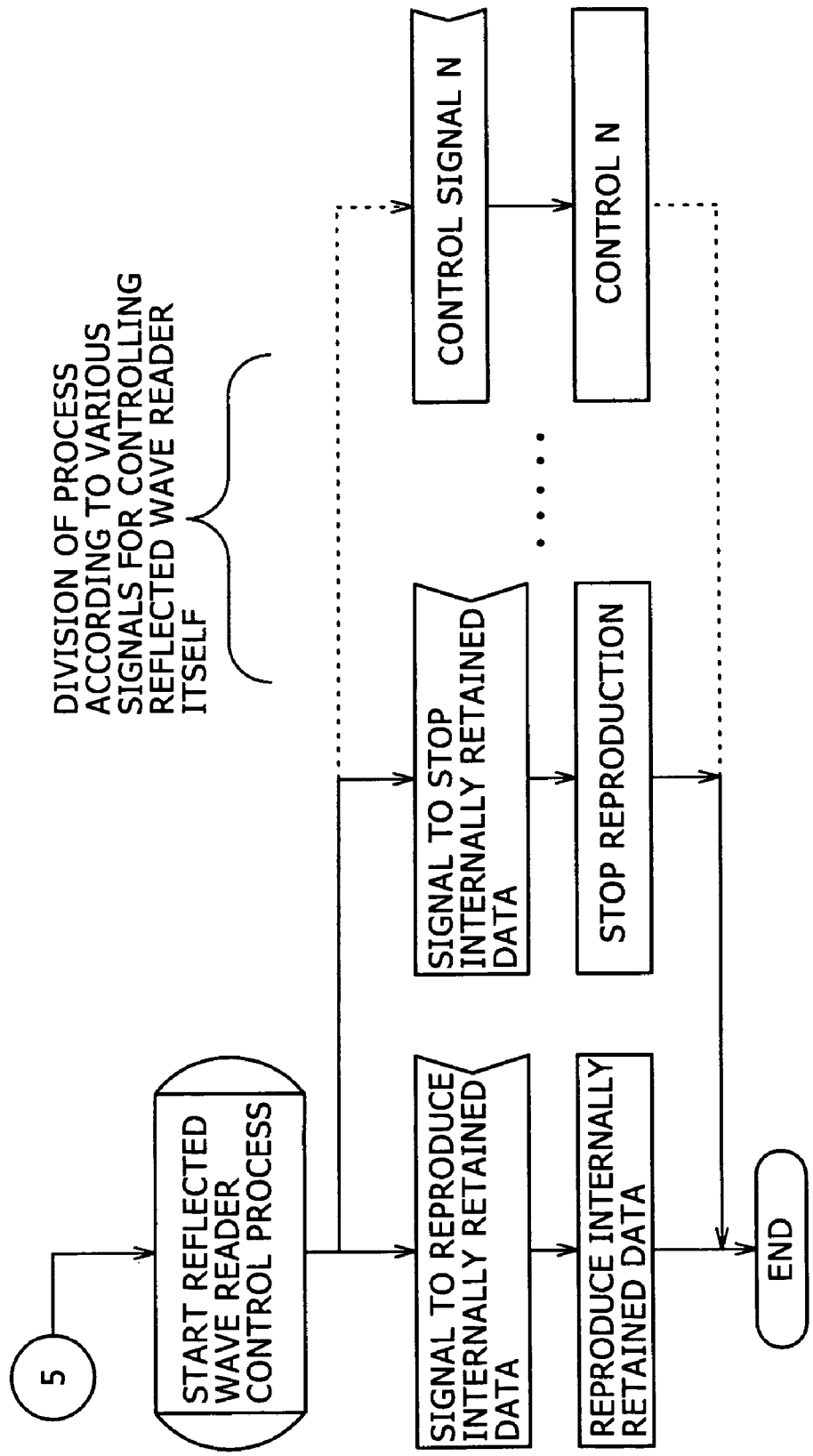
FIG. 14 is a flowchart of a procedure for performing a remote controller command process on the audio receiving and reproducing device having the reflected wave reader.

FIG. 14 represents, in the form of a flowchart, a procedure for performing a remote controller command process on the audio receiving and reproducing device having the reflected wave reader.

In this case, the process is divided according to various signals for controlling the reflected wave reader itself. For example, when receiving a remote controller command to reproduce internally retained audio data, the audio receiving and reproducing device reproduces the internally retained data. When receiving a remote controller command to stop the reproduction of the internally retained data, the audio receiving and reproducing device stops the reproduction process. When receiving a remote controller command to perform an Nth control on the audio receiving and reproducing device itself, the audio receiving and reproducing device performs control N on the audio receiving and reproducing device itself.

Figure 15:
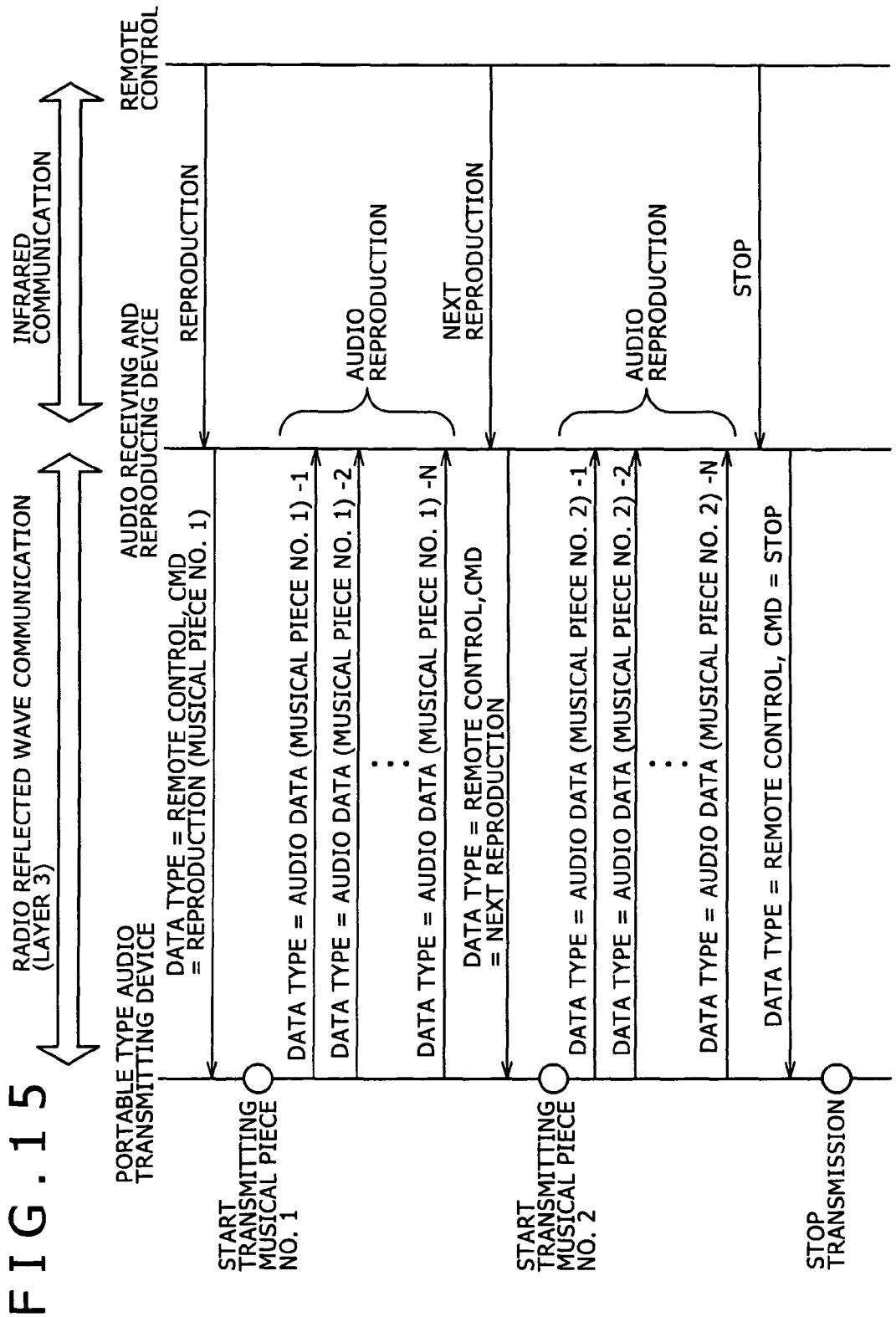
FIG. 15 is a diagram representing an operation sequence in which in response to a remote controller command, audio data stored in the audio reproducing device is received and reproduced by the audio receiving and reproducing device in the system including the audio reproducing device having the reflector, the audio receiving and reproducing device having the reflected wave reader, and the remote controller issuing an infrared command.

FIG. 15 represents an operation sequence in which in response to a remote controller command, audio data stored in the audio reproducing device is received and reproduced by the audio receiving and reproducing device in the system including the audio reproducing device having the reflector, the audio receiving and reproducing device having the reflected wave reader, and the remote controller issuing an infrared command.

When receiving a remote controller command requesting reproduction of audio data, the audio receiving and reproducing device transmits, as an ASK modulated radio signal, a control signal including information indicating the request from the remote controller and the number of a musical piece requested to be reproduced.

The audio reproducing device subjects the radio signal received to ASK demodulation and data analysis to identify the audio data requested from the remote controller. Then, the reflector in the audio reproducing device receives an unmodulated carrier from the reflected wave reader of the audio receiving and reproducing device, and transmits a reflected wave signal modulated according to the transmission data. The transmission of the audio data by a reflected wave in this case is performed by the TDD method as represented in FIG. 2. When receiving the signal transmitted by the reflected wave from the audio reproducing device, the audio receiving and reproducing device decodes the signal, and reproduces and outputs audio.

Next, when receiving a remote controller command requesting reproduction of next audio data, the audio receiving and reproducing device transmits, as an ASK modulated radio signal, a control signal including information indicating the request from the remote controller and the number of a musical piece requested to be reproduced.

The audio reproducing device subjects the radio signal received to ASK demodulation and data analysis to identify the audio data requested from the remote controller. Then, the reflector in the audio reproducing device receives an unmodulated carrier from the reflected wave reader of the audio receiving and reproducing device, and transmits a reflected wave signal modulated according to the transmission data. When receiving the signal transmitted by a reflected wave from the audio reproducing device, the audio receiving and reproducing device decodes the signal, and reproduces and outputs audio.

Next, when receiving a remote controller command requesting the stopping of reproduction of next audio data, the audio receiving and reproducing device transmits, as an ASK modulated radio signal, a control signal including information indicating the request from the remote controller and requesting a reproduction stop.

The audio reproducing device subjects the radio signal received to ASK demodulation and data analysis to identify the audio data requested from the remote controller. Then, the reflector in the audio reproducing device stops the modulation of a reflected wave signal, that is, the transmission of a reflected wave signal.

Incidentally, a reflected wave transmission system generally employs a modulation method of a relatively low bit rate such as ASK or the like. For example, a signal 0 or 1 is disposed on a signal space by operating a load impedance through for example on/off operation of termination of a directional antenna on a reflector side, whereby BPSK modulation is easily realized. However, these modulation methods have a problem in terms of transmission speed. On the other hand, for example, by providing a plurality of reflection paths having different phases from each other, and switching the reflection paths according to transmission data, it is possible to realize a phase modulation method with a higher bit rate, such as BPSK, QPSK, 8PSK modulation or the like. For example, the specification of Japanese Patent Application No. 2003-352223 already assigned to the present applicant discloses a communication system using a backscatter method incorporating a QPSK modulation process.

The present invention has been explained above in detail with reference to a specific embodiment thereof. It is obvious, however, that modifications and substitutions in the embodiment may be made by those skilled in the art without departing from the spirit of the present invention.

While in the present specification, the present invention has been described centering on an embodiment in which transmission is performed from a portable device that obtains and stores audio data to a stationary type audio reproducing device, the subject matter of the present invention is not necessarily to be limited to this. By applying the present invention also when a media content other than audio is to be transmitted from a portable device to a stationary type content reproducing device, it is possible to similarly realize non-contact, low power consumption, and high speed data transmission.

In short, the present invention has been disclosed in a form that is illustrative and contents described in the present specification are not to be construed in a restrictive manner. In order to determine the spirit of the present invention, claims are to be considered.

It should be understood by those skilled in the art that various modifications, combinations, sub-combinations and alterations may occur depending on design requirements and other factors insofar as they are within the scope of the appended claims or the equivalents thereof.

The invention claimed is:

1. A radio communication system for transmitting voice or music data, comprising:
  a data supplying source device for supplying the voice or music data, the data supplying source device having a reflector for transmitting a reflected wave signal obtained by modulating a received radio wave based on the data to be transmitted; and
  a data supply destination device for receiving the voice or music data, the data supply destination device having a reflected wave reader for transmitting an unmodulated carrier and for reading a reflected wave signal resulting from modulation of the unmodulated carrier;
  wherein the voice or music data is transmitted in packets to be reproduced on said data supply destination device by reflected wave transmission between the data supplying source device and the data supply destination device; and
  wherein when a data type indicator in the data packet indicates that the data type is voice or music the data supply destination device begins a process of decoding a part of the voice or music data packet without waiting for the voice or music data packet to be operated on by a process of a communication protocol that is at a higher protocol level than the decoding process,
  wherein when the data type indicator in the data packet indicates that the data type is a content that the data supply destination device is not ready for decoding, the data supply destination device discards the data packet including the content that the data supply destination device is not ready for decoding without waiting transfer to a process of the communication protocol that is at a higher protocol level than the decoding process, and
  wherein when the data type indicator in the data packet indicates that the data type is command a notification thereof is made to a higher protocol level than the decoding process.

2. The radio communication system as claimed in claim 1, wherein the data supplying source device includes:
  means for capturing external voice or music data and for storing the captured voice or music data;
  means for reproducing the stored voice or music data; and
  means for transmitting the stored voice or music data as the reflected wave signal using the reflector.

3. The radio communication system as claimed in claim 1, wherein the data supplying source device includes a built-in storage area, the data supplying source device storing voice or music data captured externally in one of the built-in storage area and a detachable type storage area.

4. The radio communication system as claimed in claim 1, wherein the data supply destination device includes means for decoding and reproducing the voice or music data received as the reflected wave signal from the data supplying source device.

5. The radio communication system as claimed in claim 4, wherein the data supply destination device further includes means for receiving a remote controller signal, and reflected wave transmission is performed between the data supply destination device and the data supplying source device according to the remote controller signal.

6. The radio communication system as claimed in claim 5, wherein
  in response to a received remote controller signal to reproduce voice or music data, the data supply destination device obtains the corresponding voice or music data from the data supplying source device by reflected wave transmission, and reproduces and outputs the voice or music data; and
  in response to a received remote controller signal to stop reproduction of the voice or music data, the data supply destination device ends the reflected wave transmission of the corresponding voice or music data, and stops the reproduction of the voice or music data.

7. The radio communication system as claimed in claim 1, wherein the voice or music data remains stored on said data supplying source device while said voice or music data is reproduced on said data supply destination device.

8. The radio communication system as claimed in claim 1, wherein without intervention of the higher protocol level, the data packets are supplied to the data supply destination device to decode the data, and then contents of the data packets are reproduced and output to an output device.

9. The output device of claim 8, wherein the output device is a speaker or display.

10. The radio communication system as claimed in claim 1, wherein the voice or music data remains stored on said data supplying source device while the voice or music data is managed on the data supply destination device.

11. The radio communication system as claimed in claim 1, wherein interaction between a user and the data supplying source device or the data supply destination device is substantially indistinguishable to the user.

12. The radio communication system as claimed in claim 1, wherein decoding is determined based on a description in a header part of the voice or music data packet.

13. The radio communication system as claimed in claim 1, wherein the reflected wave signal is an asymmetric signal in which the speed of the upward signal from the reflector to the reflected wave reader is greater than the speed of downward signal from the reflected wave reader to the reflector.

14. The radio communication system as claimed in claim 1, wherein at the data supply destination device the voice or music data transmitted by the data supplying source device by the reflected wave are demodulated and decoded, an audio reproduction process is performed, and the voice or music is output.

15. The radio communication system as claimed in claim 1, wherein the data supply destination device receives the voice or music data from the reflector, the audio receiving and reproducing device then temporarily stores the voice or music data in a main storage area or a nonvolatile storage device, and transfers the data to a decoder.

16. The radio communication system as claimed in claim 1, wherein the voice or music data from the data supplying source device is a stream and wherein the data supply destination device receives the stream from the reflector, the audio receiving and reproducing device then temporarily stores the voice or music data in a main storage or a nonvolatile storage device, the main storage or nonvolatile storage device further retains a software programming interacting with the voice or music data, and transfers the voice or music data to a decoder.

17. The radio communication system as claimed in claim 1, wherein the reflector further includes an antenna for reflecting an incident continuous radio wave, a circuit for generating the data to be transmitted, and an impedance changing circuit for changing the impedance of the antenna to correspond to the data to be transmitted.

18. The radio communication system as claimed in claim 1, wherein the antenna further includes a switch used to modulate the reflected wave by changing the antenna load impedance.

19. The radio communication system as claimed in claim 18, wherein voice or music data can be transmitted a single one-way direction or in a dual-way direction.

20. The radio communication system as claimed in claim 19, wherein changing the load impedance consumes less than 11 µW of power, dual-way direction of voice or music data transmission consumes less than 11 mW of power, and one-way voice or music transmission consumes less than 11 µW of power.

21. The radio communication system as claimed in claim 1, wherein a plurality of reflected wave signals can be transmitted.

22. The radio communication system as claimed in claim 21, wherein the plurality of reflected wave signals can be transmitted by a plurality of reflected paths having different phases from each others and switching the reflected path based on voice or music data transmission is possible based on phase modulation.

23. The radio communication system as claimed in claim 22, wherein the phase modulation can include BPSK, QPSK, or 8PSK modulation.

24. A radio communication device for supplying voice or music data by reflected wave transmission, said radio communication device comprising:
storing means for capturing external voice or music data and for storing the captured voice or music data;
reproducing means for reproducing the stored voice or music data;
a reflector for transmitting a reflected wave signal obtained by modulating a received radio wave based on the data to be transmitted in packets; and
communication controlling means for controlling an operation of transmitting the reflected wave signal using the reflector;
wherein the voice or music data stored by the storing means is transmitted in packets as the reflected wave signal using the reflector; and
wherein when a data type indicator in the data packet indicates that the data type is voice or music the reproducing means begins a process of decoding a part of the voice or music data packet without waiting for a process on the voice or music data packet to be operated on by a process of a communication protocol that is at a higher protocol level than the decoding process,
wherein when the data type indicator in the data packet indicates that the data type is a content that the data supply destination device is not ready for decoding, the data supply destination device discards the data packet including the content that the data supply destination device is not ready for decoding without waiting transfer to a process of the communication protocol that is at a higher protocol level than the decoding process, and
wherein when the data type indicator in the data packet indicates that the data type is command a notification thereof is made to a higher protocol level than the decoding process.

25. The radio communication device as claimed in claim 24, further comprising:
a built-in storage area;
wherein the storing means stores the captured voice or music data in one of the built-in storage area and a detachable type storage area.

26. A radio communication method for supplying voice or music data by reflected wave transmission, said radio communication method comprising:
capturing external voice or music data and storing the captured voice or music data;
reproducing the stored voice or music data; and
transmitting in packets a reflected wave signal obtained by modulating a received radio wave based on the stored voice or music data; and
when a data type indicator in the data packet indicates that the data type is voice or music, decoding a part of the voice or music data packet without waiting for the voice or music data packet to be operated on by a process of a communication protocol that is at a higher protocol level than the decoding process,
when the data type indicator in the data packet indicates that the data type is a content that the data supply destination device is not ready for decoding, the data supply destination device discards the data packet including the content that the data supply destination device is not ready for decoding not decodable without waiting transfer to a process of the communication protocol that is at a higher protocol level than the decoding process, and
when the data type indicator in the data packet indicates that the data type is command, notifying a higher protocol level than the decoding process.

* * * * *